United States Patent
Su et al.

(10) Patent No.: US 11,523,347 B2
(45) Date of Patent: Dec. 6, 2022

(54) MESSAGE TRANSMISSIONS BASED ON POWER CONTROL PARAMETERS

(71) Applicant: HUAWEI TECHNOLOGIES CO., LTD., Guangdong (CN)

(72) Inventors: Yuwan Su, Beijing (CN); Tong Ji, Beijing (CN); Zhe Jin, Beijing (CN); Weiliang Zhang, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/875,226

(22) Filed: May 15, 2020

(65) Prior Publication Data
US 2020/0288408 A1 Sep. 10, 2020

Related U.S. Application Data

(63) Continuation of application No. PCT/CN2017/111721, filed on Nov. 17, 2017.

(51) Int. Cl.
| | | |
|---|---|---|
| *H04W 52/14* | (2009.01) | |
| *H04W 74/08* | (2009.01) | |
| *H04B 17/318* | (2015.01) | |

(52) U.S. Cl.
CPC ........ *H04W 52/146* (2013.01); *H04B 17/318* (2015.01); *H04W 74/0833* (2013.01)

(58) Field of Classification Search
CPC ............. H04W 52/146; H04W 52/242; H04W 52/325; H04W 52/36; H04W 52/48;
(Continued)

(56) References Cited

U.S. PATENT DOCUMENTS

| 2015/0016312 A1 | 1/2015 | Li et al. |
| 2016/0262109 A1* | 9/2016 | Chen ................... H04W 4/70 |

(Continued)

FOREIGN PATENT DOCUMENTS

| CN | 102918895 A | 2/2013 |
| CN | 104811995 A | 7/2015 |

(Continued)

OTHER PUBLICATIONS

Qualcomm Incorporated,"4-step RACH procedure consideration",3GPP TSG-RAN WG1 NR AdHoc, R1-1700791, Jan. 16-20, 2017, 11 pages.

(Continued)

*Primary Examiner* — Philip Sobutka
(74) *Attorney, Agent, or Firm* — Fish & Richardson P.C.

(57) ABSTRACT

A message transmission method and a device are used to accelerate a random access procedure. The method includes: receiving, by a terminal device, a repetition quantity of an uplink message from a network device, in response to determining that a reference signal receive power (RSRP) range of the terminal device is within an RSRP range corresponding to a signal coverage enhancement level 0, wherein the uplink message comprises a third message of a sequence of messages comprised in a random access attempt; calculating, by the terminal device, transmit power based on a power control parameter for the repetition quantity; and sending, by the terminal device, the uplink message to the network device based on the calculated transmit power.

20 Claims, 13 Drawing Sheets

(58) Field of Classification Search
CPC .............. H04W 52/50; H04W 74/006; H04W 74/0833; H04B 17/318
USPC ......................................................... 455/522
See application file for complete search history.

(56) References Cited

U.S. PATENT DOCUMENTS

2018/0160448 A1* 6/2018 Blankenship ..... H04W 74/0833
2020/0169970 A1* 5/2020 Liu ........................ H04W 52/50

FOREIGN PATENT DOCUMENTS

CN 106961721 A 7/2017
WO 2016153025 A1 9/2016

OTHER PUBLICATIONS

Huawei et al.,"Way forward on NPRACH power control",3GPP TSG RAN WG1 Meeting #90bis, R1-1719188, Prague, Czech Republic, Oct. 9-13, 2017, 3 pages.

3GPP TS 36.213 V14.4.0 (Sep. 2017),3rd Generation Partnership Project,Technical Specification Group Radio Access Network,Evolved Universal Terrestrial Radio Access (E-UTRA),Physical layer procedures(Release 14), 461 pages.
3GPP TS 36.321 V14.4.0 (Sep. 2017),3rd Generation Partnership Project,Technical Specification Group Radio Access Network,Evolved Universal Terrestrial Radio Access (E-UTRA),Medium Access Control (MAC) protocol specification (Release 14), 108 pages.
3GPP TS 36.331 V14.4.0 (Sep. 2017),3rd Generation Partnership Project,Technical Specification Group Radio Access Network,Evolved Universal Terrestrial Radio Access (E-UTRA),Radio Resource Control (RRC),Protocol specification Release 14), 753 pages.
PCT International Search Report and Written Opinion in International Application No. PCT/CN2017/111,721, dated Jul. 4, 2018, 10 pages (With English Translation).
Ericsson, "On the UL power control of NPRACH in NB-IoT," 3GPP TSG RAN#76, RP-171218, West Palm Beach, US, Jun. 5-9, 2017, 6 pages.
Huawei et al., "On Rel-14 NB-IoT RACH power control," 3GPP TSG RAN WG1 Meeting #90bis, R1-1716984, Prague, Czech Republic, Oct. 9-13, 2017, 6 pages.
Extended European Search Report issued in European Application No. 17932047.8 dated Sep. 24, 2020, 10 pages.

* cited by examiner

MESSAGE TRANSMISSIONS BASED ON POWER CONTROL PARAMETERS

CROSS-REFERENCE TO RELATED APPLICATIONS

This application is a continuation of International Application No. PCT/CN2017/111721, filed on Nov. 17, 2017, the disclosure of which is hereby incorporated by reference in its entirety.

TECHNICAL FIELD

This application relates to the field of communications technologies, and in particular, to a message transmission method and a device.

BACKGROUND

Only when uplink transmission time of a terminal device is synchronized with that of a base station, the terminal device can be scheduled for uplink transmission. Currently, the terminal device establishes a connection to the base station and implements uplink synchronization by using a random access procedure. In a narrowband internet of things (NB-IoT) system, the random access procedure is an important means for the terminal device to obtain a dedicated channel resource in idle mode, so as to switch to connected mode.

In the NB-IoT system, there are three types of signal coverage enhancement levels (CE Levels): a CE0, a CE1, and a CE2. At present, an open loop power control manner is used for uplink transmission. In a random access attempt of the random access procedure, when the terminal device sends a message 1 (msg1), if a signal coverage enhancement level is the CE0, the terminal device enables open loop power control, and determines transmit power of the msg1 based on some power control parameters such as preamble initial power and a downlink path loss. After successfully sending the msg1, the terminal device receives a msg2 from a base station, and then the terminal device sends a msg3. If there is a message sending or receiving failure in each random access attempt of the random access procedure, the random access procedure fails, and the terminal device cannot access the base station.

SUMMARY

Embodiments of this application provide a message transmission method and a device, so as to increase a random access success rate.

According to a first aspect, a message transmission method is provided, and the method may be performed by a terminal device. The method includes: making, by the terminal device, a first random access attempt at a coverage enhancement level 0, where the first random access attempt includes determining first transmit power based on a first power control parameter and/or transmit power of a first random access preamble message, and the first random access preamble message is a random access preamble message in the first random access attempt; sending, by the terminal device, a first transmission message and/or a first uplink control message to a network device by using the first transmit power, where the first transmission message is a third message in the first random access attempt, and the first uplink control message is a feedback message for a fourth message in the first random access attempt; making, by the terminal device, a second random access attempt at the coverage enhancement level 0, where the second random access attempt is a next random access attempt made by the terminal device after the first random access attempt fails, where the second random access attempt includes determining second transmit power based on a second power control parameter and/or transmit power of a second random access preamble message, the second random access preamble message is a random access preamble message in the second random access attempt, and the determining second transmit power includes determining that the second transmit power is greater than or equal to the first transmit power; and sending, by the terminal device, a second transmission message and/or a second uplink control message to the network device by using the second transmit power, where the second transmission message is a third message in the second random access attempt, and the second uplink control message is a feedback message for a fourth message in the second random access attempt.

Correspondingly, according to a second aspect, a message transmission method is provided, where the method may be performed by a network device, and the network device is, for example, a base station. The method includes: receiving, by the network device, a first transmission message and/or a first uplink control message sent by a terminal device by using first transmit power at a coverage enhancement level 0, where the first transmit power is determined by the terminal device based on a first power control parameter and/or transmit power of a first random access preamble message in a first random access attempt, the first transmission message is a third message in the first random access attempt, the first uplink control message is a feedback message for a fourth message in the first random access attempt, and the first random access preamble message is a random access preamble message in the first random access attempt; and receiving, by the network device, a second transmission message and/or a second uplink control message sent by the terminal device by using second transmit power at the coverage enhancement level 0, where the second transmit power is determined by the terminal device based on a second power control parameter and/or transmit power of a second random access preamble message in a second random access attempt, the second transmit power is greater than or equal to the first transmit power, the second random access attempt is a next random access attempt made by the terminal device after the first random access attempt fails, the second transmission message is a third message in the second random access attempt, the second uplink control message is a feedback message for a fourth message in the second random access attempt, and the second random access preamble message is a random access preamble message in the second random access attempt.

In this embodiment of this application, the first transmission message and the second transmission message are msg3 sent in different random access attempts. When making a random access attempt at the coverage enhancement level 0, the terminal device may determine the transmit power of the first transmission message and/or the first uplink control message based on the first power control parameter and/or the transmit power of the first random access preamble message, that is, determine the first transmit power. Similarly, the terminal device may determine the transmit power of the second transmission message and/or the second uplink control message based on the second power control parameter and/or the transmit power of the second random access preamble message, that is, determine the second transmit power. In other words, the transmit power of the first transmission message and/or the first uplink control message and the transmit power of the second transmission message and/or the second uplink control message are determined according to actual situations. In addition, the second transmit power determined by the terminal device in the second random access attempt is greater than or equal to the first transmit power determined by the terminal device in the first random access attempt. Therefore, for a plurality of random access attempts, transmit power of a transmission message and/or an uplink control message in each attempt ramps up gradually. This increases a sending success rate of the transmission message and/or the uplink control message, helps the terminal device to complete random access more quickly, and increases a success rate of a random access procedure.

In a possible design, the network device determines the first power control parameter, and the first power control parameter includes at least one of the following parameters: in the first random access attempt, maximum transmit power of the terminal device, target preamble received power, a downlink path loss, preamble initial received target power, a power offset, a preamble attempt quantity, a third power ramping step, a quantity of preamble sending repetitions, a power offset of the first transmission message relative to a preamble, a path loss conversion proportionality coefficient, a transmission bandwidth parameter, a first power ramping step, a first power offset, and a third power offset, where the third power ramping step is used to determine the transmit power of the first random access preamble message, and the first power ramping step, the first power offset, and the third power offset are used to determine the first transmit power. The network device sends first indication signaling to the terminal device, and the first indication signaling is used to indicate the first power control parameter. The network device determines the second power control parameter, and the second power control parameter includes at least one of the following parameters: in the second random access attempt, maximum transmit power of the terminal device, target preamble received power, a downlink path loss, preamble initial received target power, a power offset, a preamble attempt quantity, a third power ramping step, a quantity of preamble sending repetitions, a power offset of the second transmission message relative to a preamble, a path loss conversion proportionality coefficient, a transmission bandwidth parameter, a second power ramping step, a second power offset, and a fourth power offset, where the third power ramping step is used to determine the transmit power of the second random access preamble message, and the second power ramping step, the second power offset, and the fourth power offset are used to determine the second transmit power. The network device sends second indication signaling to the terminal device, and the second indication signaling is used to indicate the second power control parameter.

The first power control parameter and the second power control parameter may be determined by the network device. After determining the first power control parameter, the network device may send the first indication signaling to the terminal device, so as to indicate the first power control parameter to the terminal device. Similarly, after determining the second power control parameter, the network device may send the second indication signaling to the terminal device, so as to indicate the second power control parameter to the terminal device. Therefore, the terminal device may determine the first transmit power based on the first power control parameter and/or the transmit power of the first random access preamble message, or determine the second transmit power based on the second power control parameter and/or the transmit power of the second random access preamble message, so as to perform the solution provided in this embodiment of this application.

This embodiment of this application provides a plurality of different solutions in which the terminal device determines the first transmit power based on the first power control parameter and/or the transmit power of the first random access preamble message, and determines the second transmit power based on the second power control parameter and/or the transmit power of the second random access preamble message. The following describes several solutions.

In a possible design, the first power control parameter includes the first power offset, and the determining, by the terminal device, first transmit power based on a first power control parameter and transmit power of a first random access preamble message includes: determining, by the terminal device, a sum of the transmit power of the first random access preamble message and the first power offset as the first transmit power; and the second power control parameter includes the second power offset, and the determining, by the terminal device, second transmit power based on a second power control parameter and transmit power of a second random access preamble message includes: determining, by the terminal device, a sum of the transmit power of the second random access preamble message and the second power offset as the second transmit power.

In this manner, the terminal device determines the sum of the transmit power of the first random access preamble message and the first power offset as the first transmit power, and the first power offset may be included in the first power control parameter. Therefore, the terminal device may obtain the first transmit power by directly adding the first power offset to the transmit power of the first random access preamble message, and similarly, may obtain the second transmit power by directly adding the second power offset to the transmit power of the second random access preamble message. There is no need to use another parameter included in the second power control parameter, which is relatively simple.

In a possible design, the determining, by the terminal device, first transmit power based on a first power control parameter and transmit power of a first random access preamble message includes: calculating, by the terminal device, third transmit power based on the first power control parameter, and determining, by the terminal device, the larger one of the transmit power of the first random access preamble message and the third transmit power as the first transmit power. Similarly, the determining, by the terminal device, second transmit power based on a second power control parameter and transmit power of a second random access preamble message includes: calculating, by the terminal device, fourth transmit power based on the second power control parameter, and determining, by the terminal device, the larger one of the transmit power of the second random access preamble message and the fourth transmit power as the second transmit power.

In this manner, the terminal device may select the larger one of transmit power calculated based on an open loop calculation method and transmit power of a random access preamble message as actual transmit power of a msg3 and/or UCI, so as to minimize a possibility that a sending failure occurs because the actual transmit power of the msg3 and/or the UCI is very low, increase a random access success rate, and also accelerate the random access procedure.

In a possible design, the determining, by the terminal device, first transmit power based on transmit power of a first random access preamble message includes: determining, by the terminal device, the transmit power of the first random access preamble message as the first transmit power. Similarly, the determining, by the terminal device, second transmit power based on transmit power of a second random access preamble message includes: determining, by the terminal device, the transmit power of the second random access preamble message as the second transmit power.

In this manner, the terminal device may directly determine transmit power of a random access preamble message as actual transmit power of a msg3 and/or UCI, without needing another calculation process. This is relatively simple and brings relatively high implementation efficiency, and the random access procedure may be further accelerated.

In a possible design, the first power control parameter includes at least one of the following parameters: in the first random access attempt, maximum transmit power of the terminal device, target preamble received power, a downlink path loss, preamble initial received target power, a power offset, a preamble attempt quantity, a third power ramping step, a quantity of preamble sending repetitions, a power offset of the first transmission message relative to a preamble, a path loss conversion proportionality coefficient, a transmission bandwidth parameter, a first power ramping step, a first power offset, and a third power offset, where the third power ramping step is used to determine the transmit power of the first random access preamble message, and the first power ramping step, the first power offset, and the third power offset are used to determine the first transmit power. The second power control parameter includes at least one of the following parameters: in the second random access attempt, maximum transmit power of the terminal device, target preamble received power, a downlink path loss, preamble initial received target power, a power offset, a preamble attempt quantity, a third power ramping step, a quantity of preamble sending repetitions, a power offset of the second transmission message relative to a preamble, a path loss conversion proportionality coefficient, a transmission bandwidth parameter, a second power ramping step, a second power offset, and a fourth power offset, where the third power ramping step is used to determine the transmit power of the second random access preamble message, and the second power ramping step, the second power offset, and the fourth power offset are used to determine the second transmit power.

The parameters that may be included in the power control parameter are described. At least one parameter included in the power control parameter may be used to calculate the transmit power. This embodiment of this application imposes no limitation on a specific calculation manner.

In a possible design, the network device further sends third indication signaling. The third indication signaling is used to instruct the terminal device to determine the first transmit power based on the first power control parameter and/or the transmit power of the first random access preamble message, and/or the third indication signaling is used to instruct the terminal device to determine the second transmit power based on the second power control parameter and/or the transmit power of the second random access preamble message. Correspondingly, the terminal device receives the third indication signaling from the network device. The third indication signaling is used to instruct the terminal device to determine the first transmit power based on the first power control parameter and/or the transmit power of the first random access preamble message, and/or the third indication signaling is used to instruct the terminal device to determine the second transmit power based on the first power control parameter and/or the transmit power of the second random access preamble message.

A terminal device of a new version and a terminal device of an old version are currently available, for example, a terminal device of a new version R14, and a terminal device of an old version R13. The terminal device of the new version is capable of implementing the solutions provided in the first aspect and the second aspect, but the terminal device of the old version may be incapable of implementing the solutions provided in the first aspect and the second aspect. In view of this, only the terminal device of the new version may be enabled to implement the solutions provided in the first aspect and the second aspect, and the terminal device of the old version may continue to determine transmit power of a msg3 and/or UCI in the prior-art manner. This purpose may be achieved by using the third indication signaling. A terminal device that receives and successfully parses the third indication signaling may determine the transmit power of the msg3 and/or the UCI by using the technical solutions provided in the embodiments of this application, but a terminal device that does not receive the third indication signaling or fails to parse the third indication signaling continues to determine the transmit power of the msg3 and/or the UCI by using the prior-art solution. The third indication signaling can be used to provide different instructions for the terminal device of the new version and the terminal device of the old version, so that terminal devices of different versions determine the transmit power of the msg3 and/or the UCI in different manners, which complies with actual configuration of the terminal devices. The technical solutions provided in the embodiments of this application herein include the solution provided in the embodiment shown in FIG. 4.

According to a third aspect, a message transmission method is provided, and the method may be performed by a terminal device. The method includes: when RSRP of the terminal device is within an RSRP range corresponding to a coverage enhancement level 0, receiving, by the terminal device, repetition quantity information from a network device, where the repetition quantity information indicates a repetition quantity of a first uplink message, and the first uplink message includes a third message or a feedback message for a fourth message in a random access attempt; calculating, by the terminal device, transmit power based on a power control parameter for any value of the repetition quantity information; and sending, by the terminal device, the first uplink message to the network device by using the transmit power.

Correspondingly, according to a fourth aspect, a message transmission method is provided, where the method may be performed by a network device, and the network device is, for example, a base station. The method includes: sending, by the network device, first indication signaling to a terminal device, where the first indication signaling is used to indicate repetition quantity information, the repetition quantity information indicates a repetition quantity of a first uplink message, and the first uplink message includes a third message or a feedback message for a fourth message in a random access attempt; and receiving, by the network device, the first uplink message sent by the terminal device by using transmit power, where the transmit power is calculated by the terminal device based on a power control parameter for any value of the repetition quantity information.

A reason why the terminal device switches from a coverage enhancement level 0 to a coverage enhancement level 1 or from the coverage enhancement level 1 to a coverage enhancement level 2 in a random access attempt, or why the terminal device sends a msg3 according to maximum transmit power of the terminal device at the coverage enhancement level 0 may be that resource allocation at the coverage enhancement level 0 is improper. Therefore, in a case without considering contention, at the time of sending the msg3 and/or UCI, it is more proper to calculate transmit power by using an open loop calculation method (that is, calculate the transmit power based on the power control parameter). Therefore, in this embodiment of this application, regardless of a value indicated by repetition quantity information configured by the network device for the msg3 and/or the UCI, the terminal device may calculate the transmit power of the msg3 and/or the UCI based on the power control parameter. That is, in this embodiment of this application, when the terminal device makes initial access at the coverage enhancement level 0, a manner in which the terminal device determines actual transmit power of the msg3 and/or the UCI is independent of the repetition. Regardless of the value indicated by the repetition, the terminal device calculates the actual transmit power of the msg3 and/or the UCI based on the power control parameter, so as to reduce the actual transmit power of the msg3 and/or the UCI, thereby reducing system noise, avoid affecting another terminal device, and reducing energy consumption of the terminal device.

In a possible design, the network device sends first signaling and second signaling, where the first signaling is used to indicate a terminal device of a first version to perform a random access attempt, and the second signaling is used to indicate a terminal device of a second version to perform a random access attempt. The first signaling is further used to indicate at least one of a total maximum random access attempt quantity, a maximum random access attempt quantity at a coverage enhancement level 0, a maximum random access attempt quantity at a coverage enhancement level 1, and a maximum random access attempt quantity at a coverage enhancement level 2 that are of the terminal device of the first version. The second signaling is further used to indicate at least one of a total maximum random access attempt quantity, a maximum random access attempt quantity at a coverage enhancement level 0, a maximum random access attempt quantity at a coverage enhancement level 1, and a maximum random access attempt quantity at a coverage enhancement level 2 that are of the terminal device of the second version. Correspondingly, the terminal device is the terminal device of the second version. The terminal device receives the first signaling and the second signaling from the network device, the first signaling is used to indicate the terminal device of the first version to perform a random access attempt, and the second signaling is used to indicate the terminal device of the second version to perform a random access attempt. The terminal device makes a random access attempt based on the second signaling. The first signaling is further used to indicate at least one of the total maximum random access attempt quantity, the maximum random access attempt quantity at the coverage enhancement level 0, the maximum random access attempt quantity at the coverage enhancement level 1, and the maximum random access attempt quantity at the coverage enhancement level 2 that are of the terminal device of the first version. The second signaling is further used to indicate at least one of the total maximum random access attempt quantity, the maximum random access attempt quantity at the coverage enhancement level 0, the maximum random access attempt quantity at the coverage enhancement level 1, and the maximum random access attempt quantity at a coverage enhancement level 2 that are of the terminal device of the second version.

Because the terminal device of the new version has different capabilities from the terminal device of the old version, this embodiment of this application provides the first signaling and the second signaling, which respectively instruct the terminal device of the old version and the terminal device of the new version to perform different operations. By configuring the first signaling and the second signaling, the network device may make the technical solution provided in this embodiment of this application compatible with the terminal device of the old version and the terminal device of the new version.

In a possible design, the power control parameter includes at least one of the following parameters: maximum transmit power of the terminal device, target preamble received power, a downlink path loss, preamble initial received target power, a power offset, a preamble attempt quantity, a power ramping step, a quantity of preamble sending repetitions, a power offset of the third message relative to a preamble, a path loss conversion proportionality coefficient, and a transmission bandwidth parameter.

The parameters that may be included in the power control parameter are described. At least one parameter included in the power control parameter may be used to calculate the transmit power. This embodiment of this application imposes no limitation on a specific calculation manner.

According to a fifth aspect, a communications device is provided. The communications device has functions for implementing the terminal device in the method design. These functions may be implemented by hardware, or may be implemented by hardware executing corresponding software. The hardware or the software includes one or more units corresponding to the foregoing functions.

In a possible design, a specific structure of the communications device may include a processor and a transceiver. The processor and the transceiver may perform corresponding functions in the method provided in the first aspect or any possible design of the first aspect.

According to a sixth aspect, a network device is provided. The network device has functions for implementing the network device in the method design. These functions may be implemented by hardware, or may be implemented by hardware executing corresponding software. The hardware or the software includes one or more units corresponding to the foregoing functions.

In a possible design, a specific structure of the network device may include a transceiver, and optionally, the specific structure of the network device may further include a processor. The processor and the transceiver may perform corresponding functions in the method provided in the second aspect or any possible design of the second aspect.

According to a seventh aspect, a communications device is provided. The communications device has functions for implementing the terminal device in the method design. These functions may be implemented by hardware, or may be implemented by hardware executing corresponding software. The hardware or the software includes one or more units corresponding to the foregoing functions.

In a possible design, a specific structure of the communications device may include a processor and a transceiver. The processor and the transceiver may perform corresponding functions in the method provided in the third aspect or any possible design of the third aspect.

According to an eighth aspect, a network device is provided. The network device has functions for implementing the network device in the method design. These functions may be implemented by hardware, or may be implemented by hardware executing corresponding software. The hardware or the software includes one or more units corresponding to the foregoing functions.

In a possible design, a specific structure of the network device may include a transceiver, and optionally, the specific structure of the network device may further include a processor. The processor and the transceiver may perform corresponding functions in the method provided in the fourth aspect or any possible design of the fourth aspect.

According to a ninth aspect, a communications device is provided. The communications device has functions for implementing the terminal device in the method design. These functions may be implemented by hardware, or may be implemented by hardware executing corresponding software. The hardware or the software includes one or more units corresponding to the foregoing functions.

In a possible design, a specific structure of the communications device may include a processing module and a transceiver module. The processing module and the transceiver module may perform corresponding functions in the method provided in the first aspect or any possible design of the first aspect.

According to a tenth aspect, a network device is provided. The network device has functions for implementing the network device in the method design. These functions may be implemented by hardware, or may be implemented by hardware executing corresponding software. The hardware or the software includes one or more units corresponding to the foregoing functions.

In a possible design, a specific structure of the network device may include a transceiver module, and optionally, the specific structure of the network device may further include a processing module. The processing module and the transceiver module may perform corresponding functions in the method provided in the second aspect or any possible design of the second aspect.

According to an eleventh aspect, a communications device is provided. The communications device has functions for implementing the terminal device in the method design. These functions may be implemented by hardware, or may be implemented by hardware executing corresponding software. The hardware or the software includes one or more units corresponding to the foregoing functions.

In a possible design, a specific structure of the communications device may include a processing module and a transceiver module. The processing module and the transceiver may perform corresponding functions in the method provided in the third aspect or any possible design of the third aspect.

According to a twelfth aspect, a network device is provided. The network device has functions for implementing the network device in the method design. These functions may be implemented by hardware, or may be implemented by hardware executing corresponding software. The hardware or the software includes one or more units corresponding to the foregoing functions.

In a possible design, a specific structure of the network device may include a transceiver module, and optionally, the specific structure of the network device may further include a processing module. The processing module and the transceiver module may perform corresponding functions in the method provided in the fourth aspect or any possible design of the fourth aspect.

According to a thirteenth aspect, a communications apparatus is provided. The communications apparatus may be the terminal device in the foregoing method design, or may be a chip disposed in the terminal device. The communications apparatus includes a memory, configured to store computer executable program code, and a processor, where the processor is coupled to the memory. The program code stored in the memory includes an instruction, and when the processor executes the instruction, the communications apparatus performs the method performed by the terminal device in the first aspect or any possible design of the first aspect.

According to a fourteenth aspect, a communications apparatus is provided. The communications apparatus may be the network device in the foregoing method design, or may be a chip disposed in the network device. The communications apparatus includes a memory, configured to store computer executable program code, and a processor, where the processor is coupled to the memory. The program code stored in the memory includes an instruction, and when the processor executes the instruction, the communications apparatus performs the method performed by the network device in the second aspect or any possible design of the second aspect.

According to a fifteenth aspect, a communications apparatus is provided. The communications apparatus may be the terminal device in the foregoing method design, or may be a chip disposed in the terminal device. The communications apparatus includes a memory, configured to store computer executable program code, and a processor, where the processor is coupled to the memory. The program code stored in the memory includes an instruction, and when the processor executes the instruction, the communications apparatus performs the method performed by the terminal device in the third aspect or any possible design of the third aspect.

According to a sixteenth aspect, a communications apparatus is provided. The communications apparatus may be the network device in the foregoing method design, or may be a chip disposed in the network device. The communications apparatus includes a memory, configured to store computer executable program code, and a processor, where the processor is coupled to the memory. The program code stored in the memory includes an instruction, and when the processor executes the instruction, the communications apparatus performs the method performed by the network device in the fourth aspect or any possible design of the fourth aspect.

According to a seventeenth aspect, a communications system is provided, where the communications system includes a communications device and a network device. The communications device is configured to make a first random access attempt at a coverage enhancement level 0, where the first random access attempt includes determining first transmit power based on a first power control parameter and/or transmit power of a first random access preamble message, and the first random access preamble message is a random access preamble message in the first random access attempt; send a first transmission message and/or a first uplink control message to the network device by using the first transmit power, where the first transmission message is a third message in the first random access attempt, and the first uplink control message is a feedback message for a fourth message in the first random access attempt; make a second random access attempt at the coverage enhancement level 0, where the second random access attempt is a next random access attempt made by the communications device after the first random access attempt fails, the second random access attempt includes determining second transmit power based on a second power control parameter and/or transmit power of a second random access preamble message, the second random access preamble message is a random access preamble message in the second random access attempt, and the determining the second transmit power includes determining that the second transmit power is greater than or equal to the first transmit power; and send a second transmission message and/or a second uplink control message to the network device by using the second transmit power, where the second transmission message is a third message in the second random access attempt, and the second uplink control message is a feedback message for a fourth message in the second random access attempt. The network device is configured to receive the first transmission message and/or the first uplink control message sent by the communications device by using the first transmit power at the coverage enhancement level 0, where the first transmit power is determined by the communications device based on the first power control parameter and/or the transmit power of the first random access preamble message in the first random access attempt, the first transmission message is the third message in the first random access attempt, the first uplink control message is the feedback message for the fourth message in the first random access attempt, and the first random access preamble message is the random access preamble message in the first random access attempt; and receive the second transmission message and/or the second uplink control message sent by the communications device by using the second transmit power at the coverage enhancement level 0, where the second transmit power is determined by the communications device based on the second power control parameter and/or the transmit power of the second random access preamble message in the second random access attempt, the second transmit power is greater than or equal to the first transmit power, the second random access attempt is a next random access attempt made by the communications device after the first random access attempt fails, the second transmission message is the third message in the second random access attempt, the second uplink control message is the feedback message for the fourth message in the second random access attempt, and the second random access preamble message is the random access preamble message in the second random access attempt.

According to an eighteenth aspect, a communications system is provided, including a communications device and a network device. The communications device is configured to: when RSRP of the communications device is within an RSRP range corresponding to a coverage enhancement level 0, receive repetition quantity information from the network device, where the repetition quantity information indicates a repetition quantity of a first uplink message, and the first uplink message includes a third message or a feedback message for a fourth message in a random access attempt; calculate transmit power based on a power control parameter for any value of the repetition quantity information; and send the first uplink message to the network device by using the transmit power. The network device is configured to send first indication signaling to the communications device, where the first indication signaling is used to indicate the repetition quantity information, the repetition quantity information indicates the repetition quantity of the first uplink message, and the first uplink message includes the third message or the feedback message for the fourth message in the random access attempt; and receive the first uplink message sent by the communications device by using the transmit power, where the transmit power is calculated by the communications device based on a power control parameter for any value of the repetition quantity information.

The communications system provided in the seventeenth aspect and the communications system provided in the eighteenth aspect may be different communications systems, or may be a same communications system.

According to a nineteenth aspect, a computer storage medium is provided. The computer readable storage medium stores an instruction. When the instruction runs on a computer, the computer performs the method in the first aspect or any possible design of the first aspect.

According to a twentieth aspect, a computer storage medium is provided. The computer readable storage medium stores an instruction. When the instruction runs on a computer, the computer performs the method in the second aspect or any possible design of the second aspect.

According to a twenty-first aspect, a computer storage medium is provided. The computer readable storage medium stores an instruction. When the instruction runs on a computer, the computer performs the method in the third aspect or any possible design of the third aspect.

According to a twenty-second aspect, a computer storage medium is provided. The computer readable storage medium stores an instruction. When the instruction runs on a computer, the computer performs the method in the fourth aspect or any possible design of the fourth aspect.

According to a twenty-third aspect, a computer program product including an instruction is provided. The computer program product stores an instruction. When the instruction runs on a computer, the computer performs the method in the first aspect or any possible design of the first aspect.

According to a twenty-fourth aspect, a computer program product including an instruction is provided. The computer program product stores an instruction. When the instruction runs on a computer, the computer performs the method in the second aspect or any possible design of the second aspect.

According to a twenty-fifth aspect, a computer program product including an instruction is provided. The computer program product stores an instruction. When the instruction runs on a computer, the computer performs the method in the third aspect or any possible design of the third aspect.

According to a twenty-sixth aspect, a computer program product including an instruction is provided. The computer program product stores an instruction. When the instruction runs on a computer, the computer performs the method in the fourth aspect or any possible design of the fourth aspect.

In the embodiments of this application, for a plurality of random access attempts, transmit power of a transmission message and/or an uplink control message in each attempt ramps up gradually, and a sending success rate of the transmission message and/or the uplink control message is increased, which helps the terminal device complete random access more quickly, and increases the success rate of the random access procedure.

DESCRIPTION OF EMBODIMENTS

Figure 1:
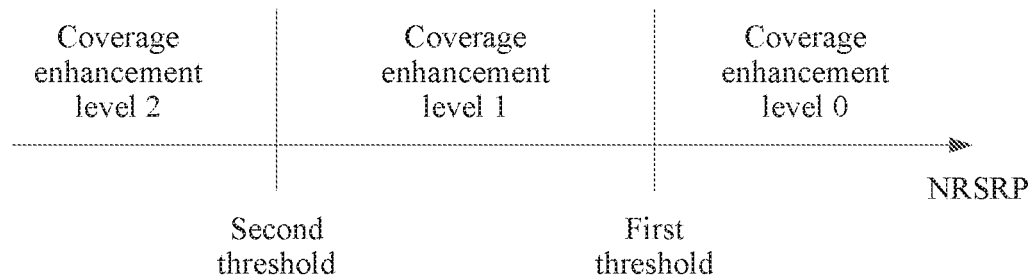
FIG. 1 is a schematic diagram of sending a msg3 by a terminal device in the prior art.

To make the purpose, technical solutions, and advantages of the embodiments of this application clearer, the following clearly describes the technical solutions of the embodiments of this application with reference to the accompanying drawings in the embodiments of this application.

The following describes some terms in the embodiments of this application to facilitate understanding of a person skilled in the art.

1) A terminal device includes a device that provides a user with voice and/or data connectivity, for example, may include a handheld device with a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a subscriber unit, a subscriber station, a mobile station, a mobile console, a remote station, an access point (AP), a remote terminal device (remote terminal), an access terminal device (access terminal), a user terminal device (user terminal), a user agent, a user device, or the like. For example, the terminal device may include a mobile phone (or referred to as a "cellular" phone), a computer with a mobile terminal device, a portable, pocket-sized, handheld, computer built-in, or in-vehicle mobile apparatus, or an intelligent wearable device. For example, the terminal device may be a device such as a personal communication service (PCS) phone, a cordless telephone set, a Session Initiation Protocol (SIP) phone, a wireless local loop (WLL) station, a personal digital assistant (PDA), a smartwatch, a smart helmet, smart glasses, or a smart band. The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

2) A network device includes, for example, a base station (for example, an access point), and may refer to a device that communicates with a wireless terminal device by using one or more cells over an air interface and that is in an access network. The base station may be configured to mutually convert a received over-the-air frame and an Internet Protocol (IP) packet and serve as a router between the terminal device and a rest portion of the access network. The rest portion of the access network may include an IP network. The base station may further coordinate attribute management of the air interface. For example, the base station may include an evolved NodeB (NodeB, eNB, or e-NodeB) in an LTE system or an LTE-advanced system (LTE-A), or may include a next generation node B (gNB) in a fifth generation (5G) new radio (NR) system. This is not limited in the embodiments of this application.

3) NB-IoT: Currently, the 3rd Generation Partnership Project (3GPP) standard is studying IoT service carrying by designing a new air interface and using a characteristic of a narrowband technology based on a cellular network. This type of IoT is referred to as NB-IoT. Compared with a conventional cellular network, a service and a terminal device of an NB-IoT system have the following features:

(1). Low service rate and long cycle: Compared with the conventional cellular network, the NB-IoT service generates smaller packets and usually is not very delay-sensitive.

(2). Massive-connection requirement: One NB-IoT base station may cover a large quantity of such terminal devices as massively deployed smart water/electricity meters, smart households, vehicles, wearable devices, and other Internet of Things terminal devices. For example, a quantity of terminal devices may exceed 10,000.

(3). Low-cost requirement: Compared with an existing cellular network terminal device, the NB-IoT system requires a lower-cost terminal device, so as to implement massive deployment of terminal devices. The low-cost requirement requires that implementation complexity of the terminal device is very low.

(4). Low power consumption requirement: The NB-IoT system requires lower power consumption of the terminal device, so as to save battery power of the terminal device, and ensure that the terminal device has a long standby time, thereby reducing labor costs of battery replacement.

4) Coverage enhancement level: In the NB-IoT system, there are three coverage enhancement levels: a CE0, a CE1, and a CE2. For example, the coverage enhancement level is determined based on narrowband reference signal received power (NRSRP). Reference may be made to FIG. 1 for a division manner of the coverage enhancement levels. In FIG. 1, two NRSRP thresholds (a first threshold and a second threshold) are used to obtain three coverage enhancement levels through division. The second threshold is less than the first threshold. For example, the first threshold is −112 dBm, and the second threshold is −122 dBm. NRSRP of the CE0 is greater than or equal to the first threshold. NRSRP of the CE1 is greater than or equal to the second threshold and less than the first threshold, and NRSRP of the CE2 is less than the second threshold. Therefore, the terminal device may determine a coverage enhancement level of the terminal device based on measured NRSRP.

The coverage enhancement level of the terminal device in this specification may be understood as a coverage enhancement level of a random access channel. That is, the terminal device sends a physical random access channel (PRACH) at the coverage enhancement level. Certainly, for the terminal device in the NB-IoT system, the terminal device sends a narrowband physical random access channel (NPRACH) at the coverage enhancement level. Therefore, descriptions such as the coverage enhancement level of the terminal device, a coverage enhancement level corresponding to the terminal device, and a coverage enhancement level of a signal may be considered equivalent.

5) The terms "system" and "network" may be used interchangeably in the embodiments of this application. "A plurality of" refers to two or more than two, and therefore, "a plurality of" may also be understood as "at least two" in the embodiments of this application. The term "and/or" describes an association relationship for describing associated objects, and represents that three relationships may exist. For example, A and/or B may represent the following three cases: Only A exists, both A and B exist, and only B exists. In addition, the character "/" generally indicates an "or" relationship between the associated objects unless otherwise specified.

In addition, unless otherwise stated, in the embodiments of this application, ordinal numbers such as "first" and "second" are intended to distinguish between a plurality of objects, and not intended to limit an order, a time sequence, priorities, or importance of the plurality of objects.

The embodiments of this application may be applied to the NB-IoT system, or may be applied to another similar communications system, for example, a Long Term Evolution (LTE) system.

To better understand the technical solutions provided in the embodiments of this application, the following first describes the technical background of the embodiments of this application.

Currently, a contention-based random access attempt usually includes four steps: A terminal device sends a random access preamble message (msg1), the terminal device receives a random access response (msg2) from a network device, the terminal device sends a first transmission message (msg3), and the terminal device receives a conflict resolution message (msg4) from the network device. After receiving the msg4, the terminal device may further send uplink control information (UCI) to the network device, and the UCI may be understood as a feedback message for the msg4. In the embodiments of this application, the msg3 is also referred to as a third message (a third message in a random access procedure), the msg4 is referred to as a fourth message (a fourth message in the random access procedure), and the UCI is referred to as an uplink control message. One random access procedure of the terminal device includes at least one random access attempt. One random access procedure of the terminal device starts from a first random access attempt in the random access procedure, and ends when the terminal device successfully completes random access, or when the terminal device fails in random access and a random access attempt quantity reaches a total maximum random access attempt quantity of the terminal device.

Figure 2:
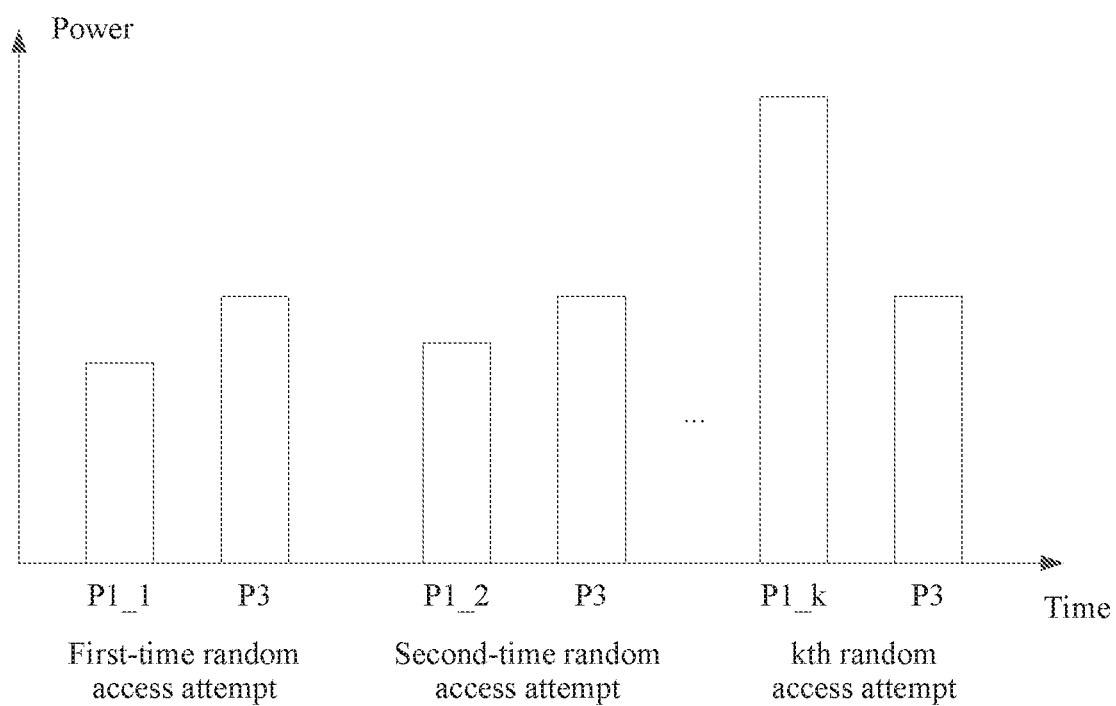
FIG. 2 is a schematic diagram of a division manner of coverage enhancement levels.

In one random access attempt of a random access procedure, when the terminal device sends a msg1, if a coverage enhancement level of the terminal device is a coverage enhancement level 0, the terminal device enables open loop power control, and determines transmit power of the msg1 based on some power control parameters such as preamble initial power and a downlink path loss. After sending the msg1, the terminal device receives a msg2 from a base station, and then the terminal device sends a msg3. Transmit power of the msg3 is determined based on a repetition quantity carried in the msg2 sent by the base station. If the repetition indicated by the msg2 is greater than 2, the terminal device sends the msg3 according to maximum transmit power of the terminal device. If the repetition indicated by the msg2 is less than or equal to 2, the terminal device also uses the open loop power control method to calculate the transmit power of the msg3. For example, if the repetition indicated by msg2 is less than or equal to 2, the terminal device uses the open loop power control method to calculate the transmit power of the msg3. However, if the calculated transmit power of the msg3 is relatively low, sending the msg3 may fail, and a current random access attempt in the random access procedure fails. In this case, the terminal device makes a random access attempt again, ramps up transmit power of a msg1, resends the msg1, receives a msg2, determines transmit power of a msg3 based on a repetition indicated by the msg2, and then resends the msg3. However, according to the prior art, when the coverage enhancement level of the terminal device is unchanged, the repetition indicated by the msg2 usually remains unchanged, and the transmit power of the msg3 that is calculated by the terminal device remains unchanged. Therefore, when the terminal device resends the msg3, sending the msg3 still fails. Consequently, the random access attempt made by the terminal device at the CE0 fails again. Referring to FIG. 2, the terminal device makes k attempts. During the first attempt, transmit power of a msg1 is P1_1, and during the kth attempt, the transmit power of the msg1 has ramped up to P1_k, but transmit power of a msg3 is always unchanged and is P3. Therefore, sending the msg3 may always fail. Consequently, the terminal device cannot complete the random access procedure at the CE0, and cannot access the base station.

In view of this, the technical solutions in the embodiments of this application are provided, so as to increase a random access success rate of the terminal device and accelerate the random access procedure.

Figure 3:
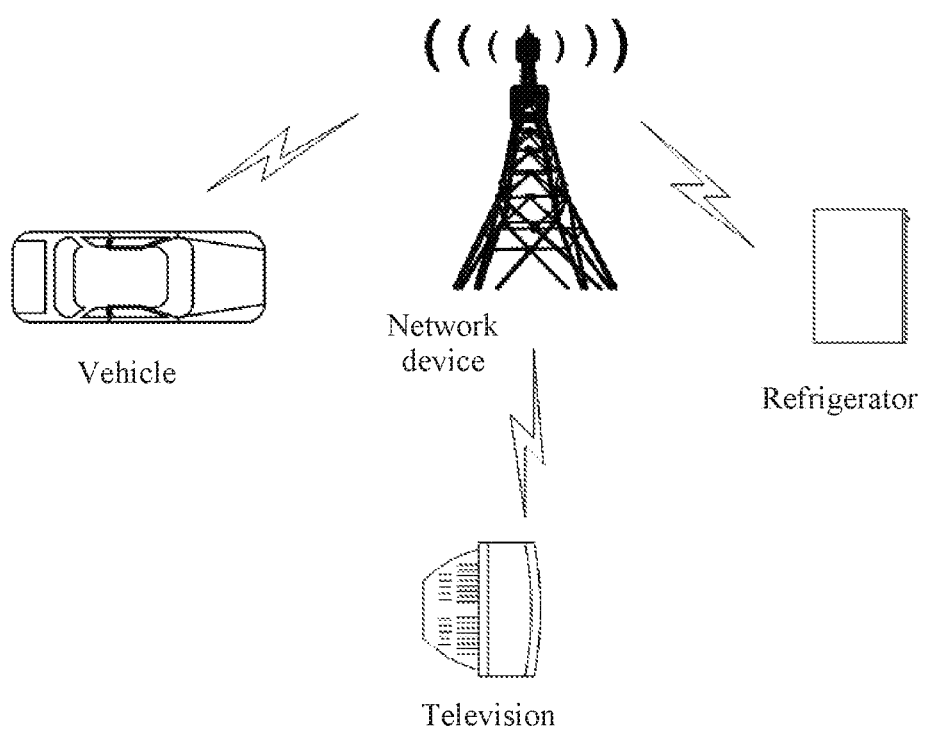
FIG. 3 is a schematic diagram of an application scenario according to an embodiment of this application.

The technical background of the embodiments of this application is described above. Referring to FIG. 3, FIG. 3 is a schematic diagram of an application scenario according to an embodiment of this application.

In FIG. 3, a network device and a plurality of terminal devices are included, and the terminal devices are terminal devices in an NB-IoT system, for example, include a refrigerator, a vehicle, and a television. For example, the network device is a base station. These terminal devices may access the base station by using a random access procedure.

With reference to the accompanying drawings, the following describes the technical solutions provided in the embodiments of this application. An example that the technical solutions provided in the embodiments of this application are applied to the application scenario shown in FIG. 3 is used in the following description. In actual application, this application is certainly not limited thereto.

Figure 4:
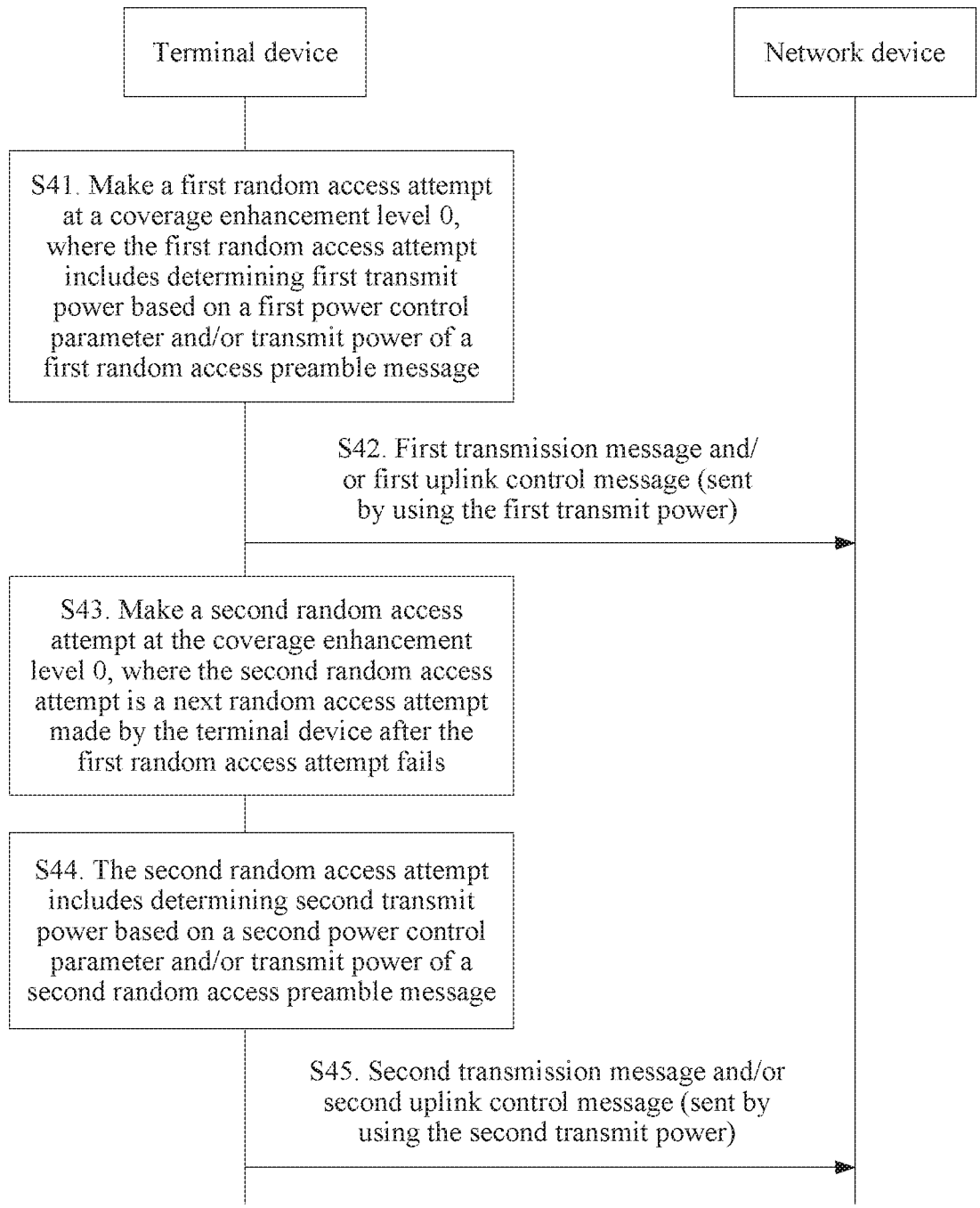
FIG. 4 is a flowchart of a message transmission method according to an embodiment of this application.

Referring to FIG. 4, an embodiment of this application provides a message transmission method, and a procedure description of the method is as follows:

S41. A terminal device makes a first random access attempt at a coverage enhancement level 0, where the first random access attempt includes determining first transmit power based on a first power control parameter and/or transmit power of a first random access preamble message, and the first random access preamble message is a random access preamble message in the first random access attempt.

S42. The terminal device sends a first transmission message and/or a first uplink control message to a network device by using the first transmit power, and the network device receives the first transmission message and/or the first uplink control message sent by the terminal device by using the first transmit power, where the first transmission message is a third message in the first random access attempt, and the first uplink control message is a feedback message for a fourth message in the first random access attempt.

S43. The terminal device makes a second random access attempt at the coverage enhancement level 0, where the second random access attempt is a next random access attempt made by the terminal device after the first random access attempt fails.

S44. The second random access attempt includes determining second transmit power based on a second power control parameter and/or transmit power of a second random access preamble message, the second random access preamble message is a random access preamble message in the second random access attempt, and the determining second transmit power includes determining that the second transmit power is greater than or equal to the first transmit power.

S45. The terminal device sends a second transmission message and/or a second uplink control message to the network device by using the second transmit power, and the network device receives the second transmission message and/or the second uplink control message sent by the terminal device by using the second transmit power, where the second transmission message is a third message in the second random access attempt, and the second uplink control message is a feedback message for a fourth message in the second random access attempt.

This embodiment of this application mainly describes how the terminal device determines transmit power of a msg3 or UCI at the coverage enhancement level 0. The UCI may be configured by using radio resource control (RRC) signaling or RRC broadcast signaling. Specifically, the RRC signaling may be a random access response (RAR) message (msg2), an RRC connection setup message (msg4), or the like, and the RRC broadcast signaling may be a system message.

In this embodiment of this application, S43 and S44 may be understood as two steps, or may be understood as one step.

In this embodiment of this application, the determining that the second transmit power is greater than or equal to the first transmit power may be understood as follows: If a power control parameter includes a path loss, the second transmit power is greater than or equal to the first transmit power without considering the path loss, and if the power control parameter does not include the path loss, the second transmit power is greater than or equal to the first transmit power.

In a random access procedure, before sending the msg3 or the UCI, the terminal device first determines the transmit power of the msg3 or the UCI. In this embodiment of this application, when a coverage enhancement level of the terminal device is the coverage enhancement level 0, the terminal device may determine the transmit power of the msg3 and/or the UCI, namely, the first transmit power or the second transmit power, based on a power control parameter and/or transmit power of a random access preamble message. In this embodiment of this application, because determined transmit power of the msg3 and/or the UCI varies with a random access attempt quantity, the determined transmit power of the msg3 and/or the UCI is named based on the random access attempt quantity in this specification. For example, the transmit power of the msg3 and/or the UCI that is determined in the first random access attempt process is referred to as the first transmit power, the transmit power of the msg3 and/or the UCI that is determined in the second random access attempt process is referred to as the second transmit power, and so on. That is, such names as the first transmit power and the second transmit power represent a same parameter, and are actual transmit power of the msg3 and/or the UCI (or final transmit power of the msg3 and/or the UCI), but have different values. The first random access attempt is any random access attempt in a random access procedure, and the second random access attempt is a random access attempt after the first random access attempt. The first random access attempt process and the second random access attempt process are used as examples, and the determining the first transmit power or the second transmit power includes but is not limited to the following determining manners:

Manner A: The first transmit power or the second transmit power is determined based on the power control parameter of the terminal device and the transmit power of the random access preamble message.

In this embodiment of this application, when the coverage enhancement level of the terminal device is the coverage enhancement level 0, after a msg1 is sent and a msg2 is received, even if a repetition indicated by the msg2 is less than 2, transmit power of a msg3 may ramp up with a random access attempt quantity.

In addition, in the prior art, transmit power of UCI is determined based on a repetition carried in a msg4 sent by a base station. If the repetition indicated by the msg4 is greater than 2, the UCI is sent according to maximum transmit power of the terminal device. If the repetition indicated by the msg4 is less than or equal to 2, the terminal device calculates the transmit power of the UCI by using an open loop power control method. Therefore, when the coverage enhancement level of the terminal device is unchanged, the transmit power of the UCI usually does not change. Therefore, in this embodiment of this application, when the coverage enhancement level of the terminal device is the coverage enhancement level 0, even if the repetition indicated by the msg4 is less than 2, the transmit power of the UCI may also ramp up with the random access attempt quantity.

Specifically, in manner A, manners of determining the actual transmit power of the msg3 or the UCI include but are not limited to the following types:

Implementation A1: The larger one of the transmit power of the first random access preamble message (referred to as a first msg1 in the following) and third transmit power is determined as the first transmit power, and the first transmit power is actual transmit power of a first msg3 and/or the first uplink control message (referred to as first UCI in the following). Likewise, the larger one of the transmit power of the second random access preamble message (referred to as a second msg1 in the following) and fourth transmit power may be determined as the second transmit power, and the second transmit power is actual transmit power of a second msg3 and/or the second uplink control message (referred to as second UCI in the following).

The first msg1 is a msg1 sent in the first random access attempt, the first UCI is UCI sent in the first random access attempt, and the third transmit power is transmit power calculated based on the first power control parameter in the first random access attempt. It may be understood that the third transmit power is the transmit power of the first msg3 and/or the first UCI that is calculated based on the first power control parameter in the first random access attempt, the first transmit power is an actually used transmit power at the time of sending the first msg3 and/or the first UCI, and the third transmit power and the first transmit power are different concepts.

Likewise, the second msg1 is a msg1 sent in the second random access attempt, the second UCI is UCI sent in the second random access attempt, and the fourth transmit power is transmit power calculated based on the second power control parameter in the second random access attempt. It may be understood that the fourth transmit power is the transmit power of the second msg3 and/or the second UCI that is calculated based on the second power control parameter in the second random access attempt, the second transmit power is an actually used transmit power at the time of sending the second msg3 and/or the second UCI, and the fourth transmit power and the second transmit power are different concepts.

In this embodiment of this application, a method for calculating the transmit power of the msg3 and/or the UCI based on the power control parameter may also be referred to as an open loop calculation method, and is described in the following.

The first power control parameter is a power control parameter used in the first random access attempt. For example, in the first random access attempt process or before the first random access attempt starts, the network device may determine the first power control parameter, and after determining the first power control parameter, the network device sends first indication signaling to the terminal device, where the first indication signaling is used to indicate the first power control parameter. The second power control parameter is a power control parameter used in the second random access attempt. For example, in the second random access attempt process or before the second random access attempt starts, the network device may determine the second power control parameter, and after determining the second power control parameter, the network device sends second indication signaling to the terminal device, where the second indication signaling is used to indicate the second power control parameter. The first power control parameter and the second power control parameter may include a same type of parameter and a same quantity of parameters, but values of some parameters may be different. That the values are different means that for a same parameter, a value of the parameter in the first power control parameter may be different from a value of the parameter in the second power control parameter. Certainly, the first power control parameter and the second power control parameter may include a same type of parameter, a same quantity of parameters, and a same parameter value. This is not limited in this embodiment of this application.

For example, the first power control parameter may include at least one of the following parameters:

maximum transmit power of the terminal device, target preamble received power, a third power ramping step, a downlink path loss, preamble initial received target power, a power offset, a preamble attempt quantity, a quantity of preamble sending repetitions, a power offset of the first transmission message relative to a preamble, a path loss conversion proportionality coefficient, a transmission bandwidth parameter, a first power ramping step, a first power offset, and a third power offset, where the third power ramping step is used to determine the transmit power of the first random access preamble message; for example, the third power ramping step is a ramp-up of the transmit power of the msg1 each time the random access attempt quantity increases by 1; and the first power ramping step, the first power offset, and the third power offset are used to determine the first transmit power.

The second power control parameter may include at least one of the following parameters:

in the second random access attempt, maximum transmit power of the terminal device, target preamble received power, a downlink path loss, preamble initial received target power, a power offset, a preamble attempt quantity, a third power ramping step, a quantity of preamble sending repetitions, a power offset of the second transmission message relative to a preamble, a path loss conversion proportionality coefficient, a transmission bandwidth parameter, a second power ramping step, a second power offset, and a fourth power offset, where the third power ramping step is used to determine the transmit power of the second random access preamble message, and the second power ramping step, the second power offset, and the fourth power offset are used to determine the second transmit power.

Figure 5:
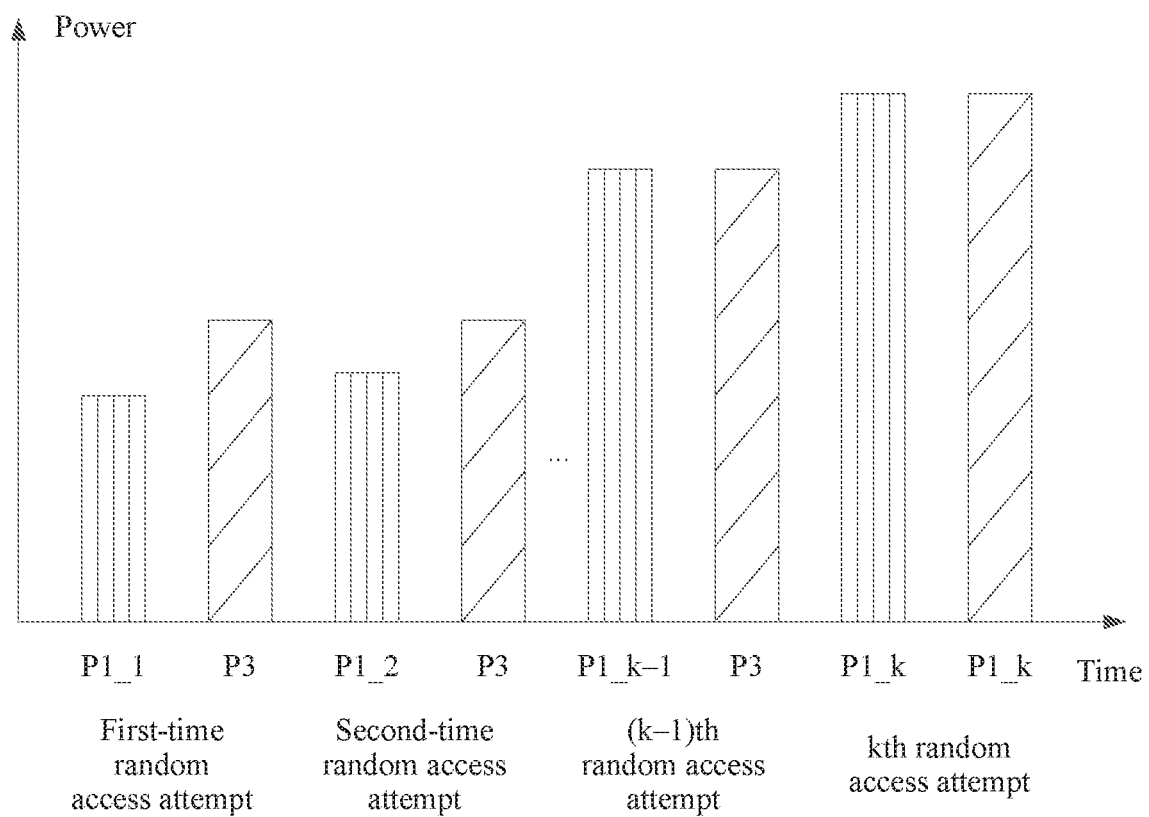
FIG. 5 to FIG. 9 are schematic diagrams of sending a msg3 and/or UCI by a terminal device according to determined transmit power according to an embodiment of this application.

For example, reference may be made to FIG. 5, which shows k random access attempt processes of the terminal device. A rectangle with vertical lines represents transmit power of the msg1, and a rectangle with slashes represents actual transmit power of the msg3 and/or the UCI. In the first-time random access attempt process performed by the terminal device, transmit power of the msg1 is P1_1, and the msg1 is successfully sent. Transmit power of the msg3 or the UCI that is calculated by the terminal device by using the open loop calculation method is P3. FIG. 5 uses an example that the first random access attempt is the first-time random access attempt. Therefore, P3 is calculated based on the first power control parameter. The terminal device determines the larger one of P1_1 and P3 as the actual transmit power of the msg3 and/or the UCI. The terminal device determines the larger one of P1_1 and P3 as the first transmit power. The terminal device sends the first msg3 or the first UCI by using the first transmit power. For example, in this case, P3 is greater than P1_1; and as shown in FIG. 5. P3 in the first-time random access attempt is the first transmit power. When the terminal device makes the second-time random access attempt, the terminal device ramps up the transmit power of the msg1, for example, ramps up the transmit power from P1_1 to P1_2; and the terminal device transmits the msg1 at the transmit power P1_2. In this embodiment, because the first random access attempt is the first-time random access attempt, the second random access attempt is the second-time random access attempt. The transmit power of the msg3 or the UCI that is calculated by the terminal device by using the open loop calculation method is, for example, still P3. In this case, P3 is calculated based on the second power control parameter, but because a value of a parameter for calculation in the first power control parameter may be equal to a value of a parameter for calculation in the second power control parameter, two calculation results are equal and are P3. Then, the terminal device determines the larger one of P1_2 and P3 as the second transmit power, and sends the second msg3 or the second UCI by using the second transmit power. For example, in this case, P3 is greater than P1_2; and as shown in FIG. 5, P3 in the second-time random access attempt is the second transmit power. Because the transmit power of the msg1 ramps up in each random access attempt process, the transmit power of the msg3 or the UCI that is calculated by using the open loop calculation method is less than the transmit power of the msg1 after the terminal device makes a specific quantity of random access attempts. It can be learned from FIG. 5 that, when the terminal device makes the (k−1)th random access attempt and the kth random access attempt, transmit power of the msg3 or the UCI that is calculated by using the open loop calculation method is less than transmit power of the msg1. Therefore, when the terminal device makes the (k−1)th random access attempt and the kth random access attempt, actual transmit power of the msg3 and/or the UCI is the transmit power of the msg1 (the actual transmit power of the msg3 and/or the UCI in the (k−1)th random access attempt is referred to as (k−1)th transmit power, and the actual transmit power of the msg3 and/or the UCI in the kth random access attempt is referred to as kth transmit power); by analogy, until the terminal device succeeds in random access, or the random access attempt quantity of the terminal device reaches a specified maximum random access attempt quantity at the coverage enhancement level 0. The maximum random access attempt quantity of the terminal device at the coverage enhancement level 0 may be preset by the network device or specified by a protocol.

FIG. 5 uses an example in which the first random access attempt is the first-time random access attempt, and the second random access attempt is the second-time random access attempt. In actual, the first random access attempt may be any random access attempt in FIG. 5, and the second random access attempt may be a next random access attempt after the first random access attempt in FIG. 5.

Implementation A2: A sum of the transmit power of the first msg1 and a first power offset is determined as the first transmit power. Likewise, a sum of the transmit power of the second msg1 and a second power offset is determined as the second transmit power.

Both the first power control parameter and the second power control parameter may further include a power offset parameter. In different random access attempts, values of the power offsets may be the same or may be different. To distinguish between different random access attempt processes, a power offset in the first random access attempt (also in the first power control parameter) is referred to as the first power offset, and a power offset in the second random access attempt (also in the second power control parameter) is referred to as the second power offset. Both the first power offset and the second power offset are used to determine the transmit power of the msg3 and/or the UCI. For example, the first power offset is used to determine the transmit power of the first msg3 and/or the first UCI, and the second power offset is used to determine the transmit power of the second msg3 and/or the second UCI.

That is, in implementation A2, the transmit power of the msg3 and/or the UCI does not need to be calculated based on the power control parameter, but the sum of the transmit power of the msg1 and the power offset is determined as final transmit power of the msg3 and/or the UCI. This manner is relatively simple. The first power offset or the second power offset (namely, a value of the power offset) may be specified by a protocol or may be indicated by the network device.

For example, the second power offset may be greater than the first power offset, that is, the value of the power offset may increase with the random access attempt quantity; or the second power offset may be equal to the first power offset, that is, the value of the power offset remains unchanged. Transmit power of the msg1 is different in two consecutive random access attempts (the transmit power of the msg1 ramps up). Therefore, the second transmit power determined in the second random access attempt is greater than the first transmit power determined in the first random access attempt. Therefore, this embodiment of this application does not impose a limitation that the second power offset needs to be greater than the first power offset.

Figure 6:
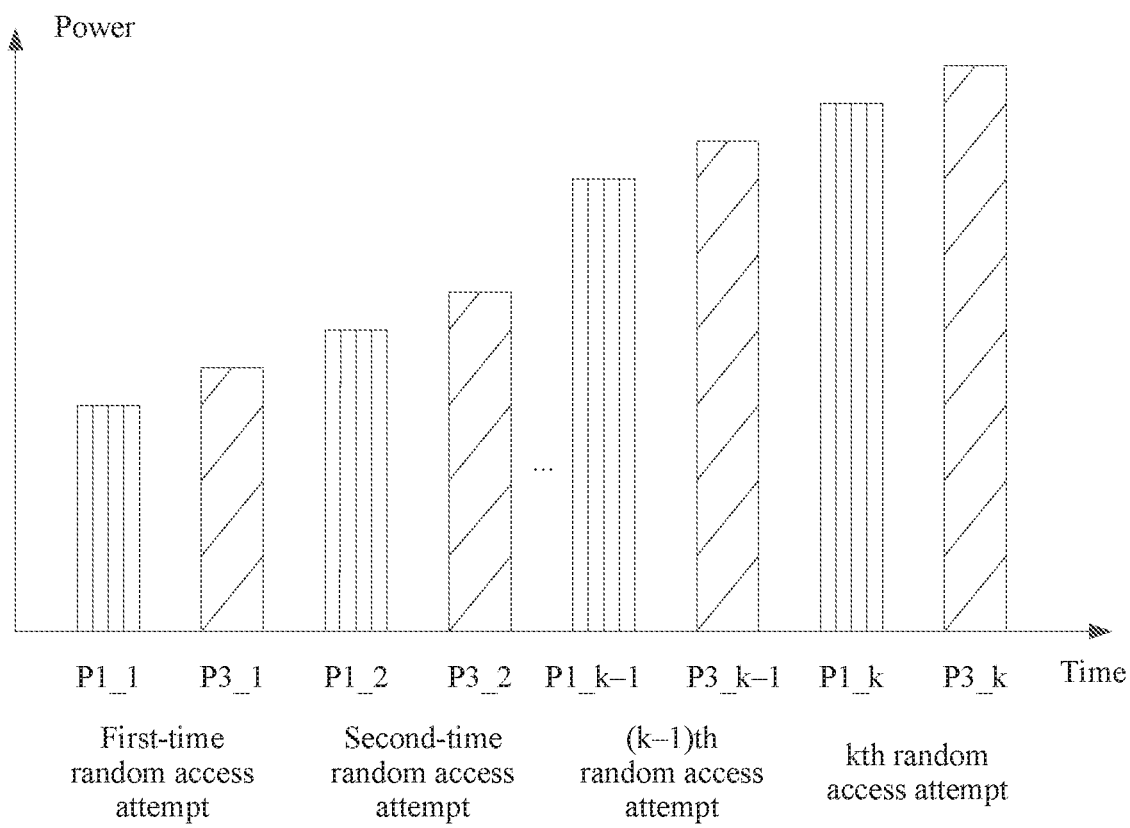

For example, reference may be made to FIG. 6, which shows k random access attempt processes performed by the terminal device. A rectangle with vertical lines represents transmit power of the msg1, and a rectangle with slashes represents actual transmit power of the msg3 and/or the UCI. FIG. 6 uses an example that a value of a power offset used by the terminal device in each random access attempt is the same, that is, the first power offset is equal to the second power offset. In the first-time random access attempt process performed by the terminal device, transmit power of the msg1 is P1_1, for example, the first random access attempt is the first-time random access attempt. Therefore, the terminal device determines a sum of P1_1 and the first power offset as the first transmit power, and sends the first msg3 and/or the first UCI by using the first transmit power. In FIG. 6, P3_1 represents the first transmit power in the first random access attempt. When the terminal device makes the second random access attempt, the terminal device ramps up the transmit power of the msg1, for example, ramps up the transmit power from P1_1 to P1_2, and the terminal device sends the msg1 by using the transmit power P1_2. Because the first-time random access attempt is the first random access attempt, the second-time random access attempt is the second random access attempt. Therefore, the terminal device determines a sum of P1_2 and the second power offset as the second transmit power, and sends the second msg3 and/or the second UCI by using the second transmit power. In FIG. 6, P3_2 represents the second transmit power in the second random access attempt; by analogy, until the terminal device succeeds in random access, or a random access attempt quantity of the terminal device reaches a specified maximum random access attempt quantity at the coverage enhancement level 0. The maximum random access attempt quantity of the terminal device at the coverage enhancement level 0 may be preset by the network device or specified by a protocol.

FIG. 6 uses an example in which the first random access attempt is the first-time random access attempt, and the second random access attempt is the second-time random access attempt. In actual, the first random access attempt may be any random access attempt in FIG. 6, and the second random access attempt may be a next random access attempt after the first random access attempt in FIG. 6.

When the coverage enhancement level of the terminal device is the coverage enhancement level 0, the transmit power of the msg3 and/or the UCI may ramp up with the random access attempt quantity in different random access attempt processes. The larger one of the transmit power of the msg1 and the transmit power calculated based on the power control parameter is used as the actual transmit power of the msg3 and/or the UCI, or the sum of the transmit power of the msg1 and the power offset is used as the actual transmit power of the msg3 and/or the UCI, so that the terminal device can complete the random access procedure more quickly, and power consumption of the terminal device can be reduced.

In manner A, the terminal device calculates the transmit power of the msg3 and/or the UCI based on the power control parameter, that is, the terminal device calculates the transmit power of the msg3 and/or the UCI in the open loop calculation manner. In an example, that the terminal device calculates the transmit power of the msg3 and/or the UCI based on the power control parameter may be implemented by using the following formula (1):

$$P_{NPUSCH,c}(i) = \min\begin{cases} P_{CMAX,c}(i), \\ 10\log_{10}(M_{NPUSCH,c}(i)) + P_{O\_NPUSCH,c}(j) + \alpha_c(j) \cdot PL_c \end{cases} \quad \text{[dBm]}$$

formula (1)

Specifically, $P_{O\_NPUSCH,c}(2) = P_{O\_NORMAL\_NPUSCH,c}(2) = P_{O\_PRE} + \Delta_{PREAMBLE\_Msg3}$.

$P_{NPUSCH,c}(i)$ represents transmit power that is on a subframe i in a cell C and that is of a signal on a narrowband physical uplink shared channel (NPUSCH). $P_{CMAX,c}(i)$ represents maximum transmit power of the terminal device, and specifically represents maximum transmit power of the terminal device when the terminal device sends a signal of a PRACH or an NPRACH on the subframe i in the cell C. $M_{NPUSCH,c}(i)$ has different values on different subcarrier bandwidths. For example, when the subcarrier bandwidth is 3.75 K, the value of $M_{NPUSCH,c}(i)$ is $\{1/4\}$; when the subcarrier bandwidth is 15 K, the value of $M_{NPUSCH,c}(i)$ is $\{1, 3, 6, 12\}$. $P_{O\_PRE}$ represents preamble initial received target power and is consistent with $P_{PIRT}$. $\Delta_{PREAMBLE\_Msg3}$ represents a power offset and specifically represents a power offset of the msg3 relative to a preamble. A value of $\alpha_c(j)$ is 1 when j=2. $PL_c$ represents a downlink path loss of the cell C that is measured by the terminal device.

Certainly, formula (1) is merely an example, and a manner in which the terminal device calculates the transmit power of the msg3 and/or the UCI based on the power control parameter is not limited thereto. The power control parameter may be obtained by the terminal device by receiving a system message and/or higher layer signaling sent by the network device, and the higher layer signaling is, for example, radio resource control (RRC) signaling. For example, the terminal device may obtain the first power control parameter and the second power control parameter by receiving the system message and/or the higher layer signaling sent by the network device.

In addition, the foregoing solution further relates to msg1 sending performed by the terminal device, and the terminal device also needs to calculate the transmit power of the msg1. In this embodiment of this application, when the coverage enhancement level of the terminal device is the coverage enhancement level 0, the terminal device may also calculate the transmit power of the msg1 based on the power control parameter. For example, the terminal device calculates the transmit power of the first msg1 based on the first power control parameter in the first random access attempt, and the terminal device calculates the transmit power of the second msg1 based on the second power control parameter in the second random access attempt. For example, an NB-IoT system is used as an example. That the terminal device calculates the transmit power of the msg1 based on the power control parameter, that is, calculates transmit power of an NPRACH may be implemented by using the following formula (2):

$$P_{NPRACH} = \min\left\{\begin{array}{l}P_{CMAX,c}(i),\\ P_{PRT} + PL_c\end{array}\right\}(dBm) \quad \text{formula (2)}$$

Specifically, $P_{PRT} = P_{PIRT} + P_{DP} + (N_{p1}-1) \times P_s - 10 \log_{10} N_{p2}$.

$P_{NPRACH}$ represents transmit power of a signal on the NPRACH. $P_{CMAX,c}(i)$ represents maximum transmit power of the terminal device and specifically represents maximum transmit power of the terminal device when the terminal device sends a signal of a physical random access channel on a subframe i in a cell C. $P_{PRT}$ represents target preamble received power. $PL_c$ represents a downlink path loss of the cell C that is measured by the terminal device. $P_{PIRT}$ represents preamble initial received target power. $P_{DP}$ represents a power offset and specifically represents a preamble power offset. $N_{p1}$ represents a preamble attempt quantity and specifically represents a preamble attempt sending quantity. For example, when the terminal device performs fifth attempt sending, a value of $N_{p1}$ is 5. $P_s$ represents a third power ramping step and specifically represents a power ramp-up value when the terminal device gains access again after random access fails. $N_{p2}$ represents a preamble repetition quantity in each preamble attempt.

Certainly, formula (2) is merely an example, and a manner in which the terminal device calculates the transmit power of the msg1 based on the power control parameter is not limited thereto. In addition, the transmit power of the msg1 may be determined by using another parameter in addition to the power control parameter. This is not limited in this embodiment of this application.

In addition, in formula (2), the transmit power of the msg1 is calculated when the terminal device is at the coverage enhancement level 0. If the terminal device is at another coverage enhancement level, for example, a coverage enhancement level 1 or a coverage enhancement level 2, the terminal device may determine that the transmit power of the msg1 is the maximum transmit power of the terminal device.

Manner B: The first transmit power is determined based on the transmit power of the random access preamble message.

In this embodiment of this application, when the coverage enhancement level of the terminal device is the coverage enhancement level 0, after a msg1 is sent and a msg2 is received, even if a repetition indicated by the msg2 is less than 2, transmit power of a msg3 may ramp up with a random access attempt quantity. Likewise, when the coverage enhancement level of the terminal device is the coverage enhancement level 0, even if a repetition indicated by a msg4 is less than 2, transmit power of UCI may also ramp up with the random access attempt quantity.

Specifically, in manner B, the transmit power of the first msg1 may be determined as the first transmit power, and similarly, the transmit power of the second msg1 may be determined as the second transmit power.

That is, in implementation B, the transmit power of the msg3 or the UCI does not need to be calculated based on the power control parameter, and the transmit power of the msg1 is directly determined as actual transmit power of the msg3 and/or the UCI. This manner is relatively simple.

Figure 7:
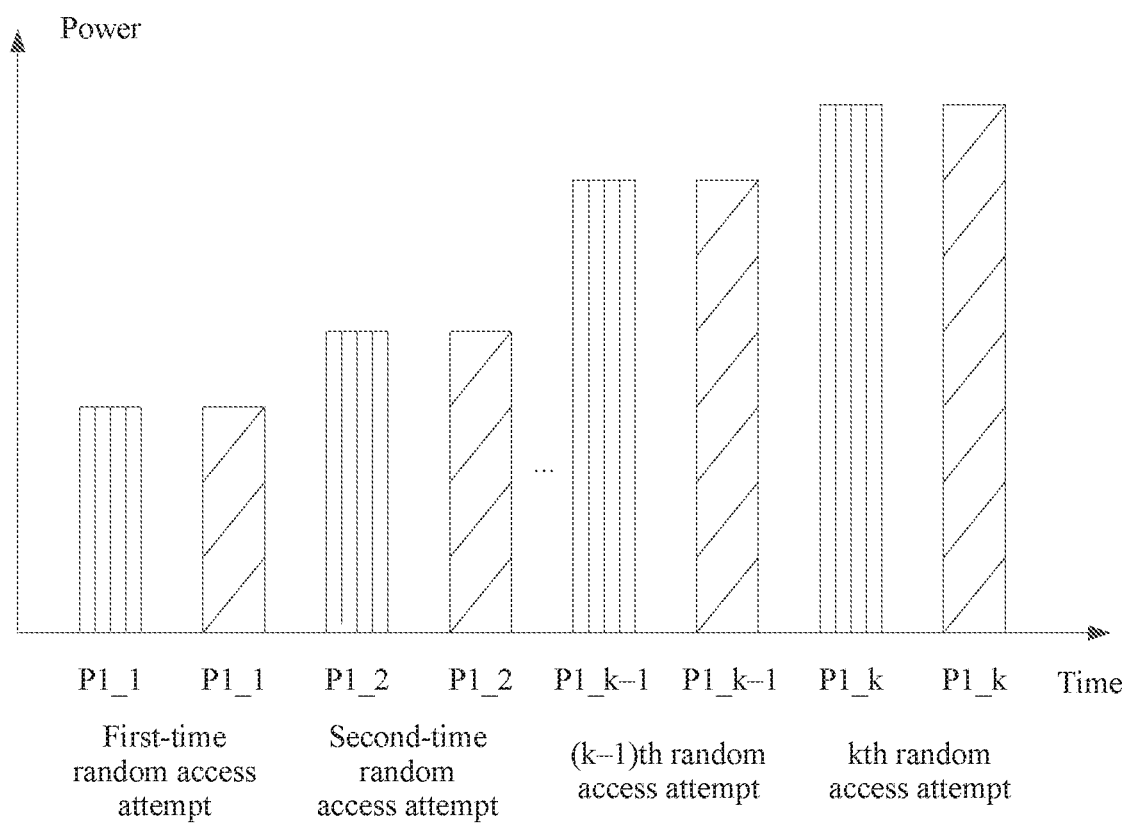

For example, reference may be made to FIG. 7, which shows k random access attempt processes of the terminal device. A rectangle with vertical lines represents transmit power of the msg1, and a rectangle with slashes represents actual transmit power of the msg3 and/or the UCI. In the first-time random access attempt process performed by the terminal device, transmit power of the msg1 is P1_1. That the first random access attempt is the first-time random access attempt is used as an example. Therefore, the terminal device determines P1_1 as the first transmit power, and sends the first msg3 and/or the first UCI by using the first transmit power. When the terminal device makes the second-time random access attempt, the terminal device ramps up the transmit power of the msg1, for example, ramps up the transmit power from P1_1 to P1_2, and the terminal device sends the msg1 at the transmit power P1_2. Because the first random access attempt is the first-time random access attempt, the second random access attempt is the second-time random access attempt. Therefore, the terminal device determines P1_2 as the second transmit power, and sends the second msg3 or the second UCI by using the second transmit power; by analogy, until the terminal device succeeds in random access, or a random access attempt quantity of the terminal device reaches a specified maximum random access attempt quantity at the coverage enhancement level 0. The maximum random access attempt quantity of the terminal device at the coverage enhancement level 0 may be preset by the network device or specified by a protocol.

FIG. 7 uses an example in which the first random access attempt is the first-time random access attempt, and the second random access attempt is the second-time random access attempt. In actual, the first random access attempt may be any random access attempt in FIG. 7, and the second random access attempt may be a next random access attempt after the first random access attempt in FIG. 7.

For a manner of calculating the transmit power of the msg1, refer to related descriptions in manner A, and details are not described.

When the coverage enhancement level of the terminal device is the coverage enhancement level 0, the transmit power of the msg3 and/or the UCI may ramp up with the random access attempt quantity in different random access attempt processes, and the transmit power of the msg1 is directly used as the transmit power of the msg3. This manner is simple, helps the terminal device to complete the random access procedure more quickly, and reduces power consumption of the terminal device.

Manner C: Actual transmit power of the msg3 and/or the UCI is calculated based on the power control parameter.

In implementation C, the transmit power of the msg3 and/or the UCI may be directly calculated based on the power control parameter, and the transmit power of the msg1 or another message is not required. This manner is relatively simple.

Specifically, in manner C, manners of determining the actual transmit power of the msg3 and/or the UCI include but are not limited to the following types:

Implementation C1: A sum of third transmit power and a third power offset is determined as the first transmit power. Similarly, a sum of fourth transmit power and a fourth power offset is determined as the second transmit power. Both the third power offset and the fourth power offset are used to determine the transmit power of the msg3 and/or the UCI.

The first power control parameter and the second power control parameter further include a power offset parameter. The power offset parameter herein is different from the power offset parameter in implementation A2. For differentiation, the power offset parameter in implementation A2 may be referred to as a power offset parameter A, and the power offset parameter in implementation C1 may be referred to as a power offset parameter B. The power offset parameter A is used to cooperate with the transmit power of the msg1 to determine the actual transmit power of the msg3 and/or the UCI, and the power offset parameter B is used to cooperate with transmit power calculated in an open loop manner to determine the actual transmit power of the msg3 and/or the UCI. In the first power control parameter, the power offset parameter A is a first power offset parameter, and the power offset parameter B is a third power offset parameter. In the second power control parameter, the power offset parameter A is a second power offset parameter, and the power offset parameter B is a fourth power offset parameter. The third power offset and the fourth power offset (namely, values of the power offset parameter B) may be specified by a protocol or may be indicated by the network device.

The third transmit power is the transmit power of the first msg3 and/or the first UCI that is calculated based on the first power control parameter in the first random access attempt, and the fourth transmit power is the transmit power of the second msg3 and/or the second UCI that is calculated based on the second power control parameter in the second random access attempt.

The value of the power offset parameter B used by the terminal device in each random access attempt may be the same or may be different. This is not limited in this embodiment of this application. For example, the third power offset and the fourth power offset may be the same or may be different. When the coverage enhancement level is unchanged, or when the repetition indicated by the msg2 and/or the msg4 is less than 2, the transmit power of the msg3 and/or the UCI that is calculated based on the open loop calculation method is usually unchanged. In consideration of this, the value of the power offset parameter B may be enabled to increase with the random access attempt quantity. For example, the fourth power offset is greater than the third power offset, so that the second transmit power determined by the terminal device in the second random access attempt is greater than or equal to the first transmit power determined in the first random access attempt.

Figure 8:
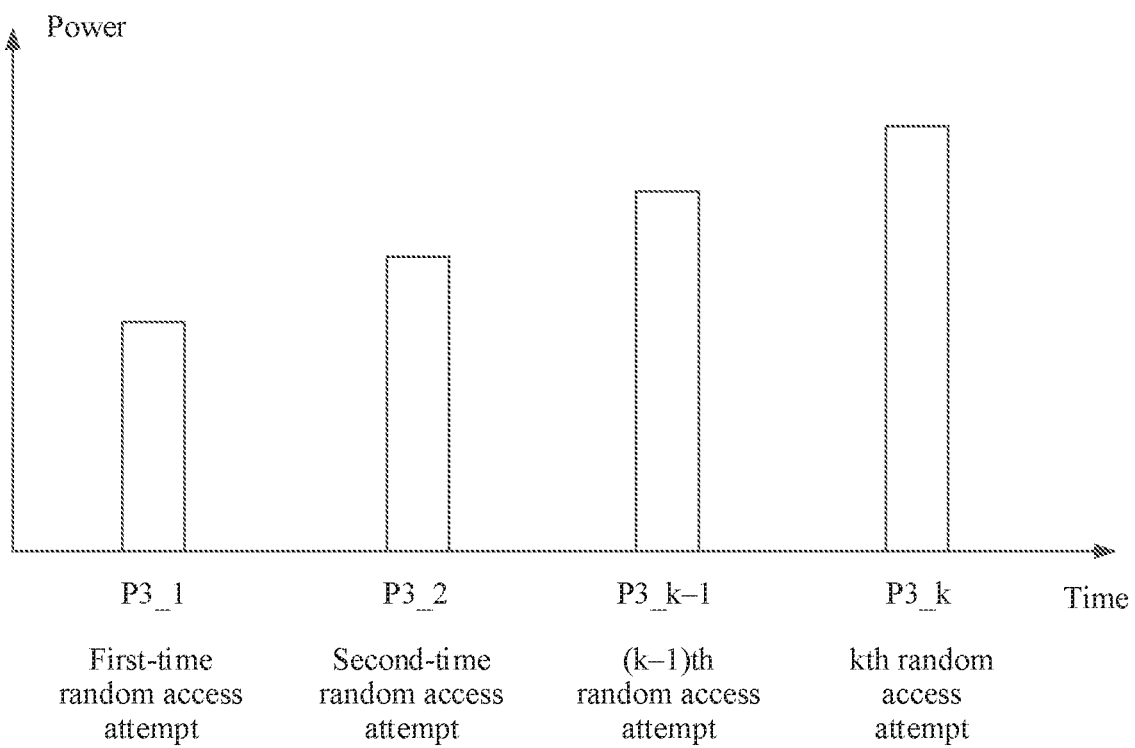

For example, reference may be made to FIG. 8, which shows k random access attempt processes performed by the terminal device. A rectangle represents actual transmit power of the msg3 and/or the UCI. In the first-time random access attempt process performed by the terminal device, transmit power of the msg3 and/or the UCI that is calculated in the open loop calculation manner is P3. For example, the first-time random access attempt is the first random access attempt. Therefore, the terminal device determines a sum of P3 and the third power offset as the first transmit power, and sends the first msg3 and/or the first UCI by using the first transmit power. In FIG. 8, P3_1 represents the first transmit power in the first-time random access attempt. When the terminal device makes the second-time random access attempt, the terminal device calculates transmit power of the msg3 and/or the UCI in the open loop calculation manner again (or, if it is determined that the transmit power of the msg3 or the UCI that is calculated in the open loop calculation manner is unchanged relative to a calculation result in the first-time random access attempt, no further calculation may be required). For example, the transmit power is still P3. Because the first-time random access attempt is the first random access attempt, the second-time random access attempt is the second random access attempt. Therefore, the terminal device determines a sum of P3 and the fourth power offset as the second transmit power, and sends the second msg3 and/or the second UCI by using the second transmit power. In FIG. 8, P3_2 represents the second transmit power in the second-time random access attempt. In this embodiment, the value of the power offset parameter B increases with the random access attempt quantity, so that actual transmit power of the msg3 and/or the UCI that is determined by the terminal device in a subsequent random access attempt is greater than or equal to actual transmit power of the msg3 and/or the UCI that is determined in a previous random access attempt; by analogy, until the terminal device succeeds in random access, or a random access attempt quantity of the terminal device reaches a specified maximum random access attempt quantity at the coverage enhancement level 0. The maximum random access attempt quantity of the terminal device at the coverage enhancement level 0 may be preset by the network device or specified by a protocol.

FIG. 8 uses an example in which the first random access attempt is the first-time random access attempt, and the second random access attempt is the second-time random access attempt. In actual, the first random access attempt may be any random access attempt in FIG. 8, and the second random access attempt may be a next random access attempt after the first random access attempt in FIG. 8.

Implementation C2: A sum of third transmit power and a first power ramping step is determined as the first transmit power. Similarly, a sum of fourth transmit power and a second power ramping step is determined as the second transmit power.

In this implementation, the first power control parameter and the second power control parameter may further include a power ramping step parameter. In different random access attempt processes of a random access procedure, values of the power ramping step parameter may be the same or may be different. For example, values of the power ramping step parameter may be the same or may be different in the first random access attempt and the second random access attempt. Therefore, a power ramping step in the first random access attempt (namely, in the first power control parameter) is referred to as the first power ramping step, and a power ramping step in the second random access attempt (namely, in the second power control parameter) is referred to as the second power ramping step. The first power ramping step is used to determine the transmit power of the first msg3 and/or the first UCI, and the second power ramping step is used to determine the transmit power of the second msg3 and/or the second UCI.

In an example, the first power ramping step or the second power ramping step may be an integer multiple of a third power ramping step, and the third power ramping step may be a ramp-up of the transmit power of the msg1 that ramps up with the random access attempt quantity. That is, a ramp-up of the actual transmit power of the msg3 and/or the UCI may be an integer multiple of the ramp-up of the transmit power of the msg1, or the first power ramping step and the second power ramping step may be set to other values. For example, the first power ramping step or the second power ramping step is specified by a protocol. It may be understood that the ramp-up of the actual transmit power of the msg3 and/or the UCI may be specified by a protocol.

It can be learned from the foregoing description that in implementation C2, the actual transmit power of the msg3 and/or the UCI may be ramped up. Specifically, when the random access attempt quantity increases by one, the actual transmit power of the msg3 and/or the UCI ramps up once.

Figure 9:
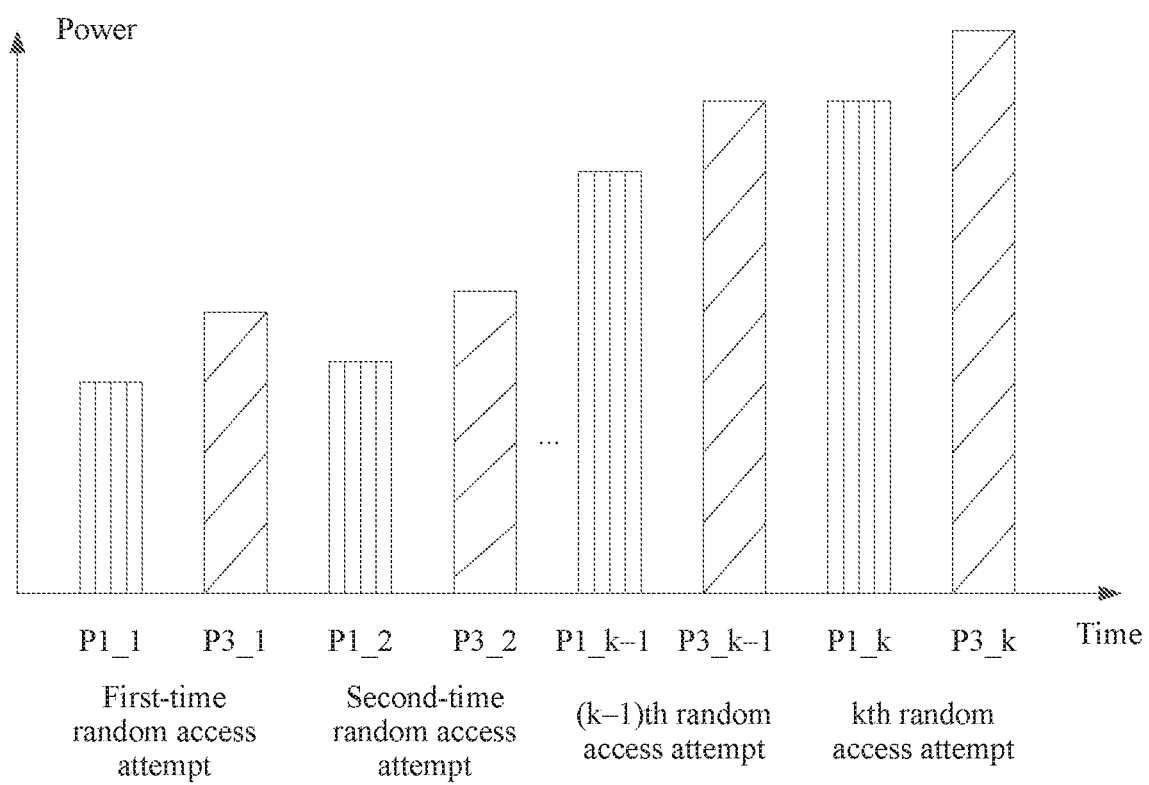

For example, reference may be made to FIG. 9, which shows k random access attempt processes of the terminal device. A rectangle with vertical lines represents transmit power of the msg1, and a rectangle with slashes represents actual transmit power of the msg3 and/or the UCI. In the first-time random access attempt process performed by the terminal device, transmit power of the msg1 is P1_1, and transmit power of the msg3 or the UCI that is calculated by the terminal device by using the open loop calculation method is P3. That the first-time random access attempt is the first random access attempt is used as an example, and the first-time random access attempt is, for example, the first-time random access attempt in a random access procedure. Therefore, the transmit power of the msg3 and/or the UCI does not ramp up, and the first power ramping step may be considered as 0. The terminal device determines P3 as the first transmit power, and sends the first msg3 and/or the first UCI by using P3. In FIG. 9, P3_1 represents P3. When the terminal device makes the second-time random access attempt, the terminal device ramps up the transmit power of the msg1, for example, ramps up the transmit power by the third power ramping step on a basis of P1_1. Then, P1_1 is ramped up to P1_2 (that is, a difference between P1_2 and P1_1 is the third power ramping step). The terminal device sends the msg1 at the transmit power P1_2. Because the random access attempt quantity increases by one, the terminal device also ramps up P3 to obtain P3+$D_1$. Because the first-time random access attempt is the first random access attempt, the second-time random access attempt is the second random access attempt. Therefore, $D_1$ is the second power ramping step in this case. The terminal device determines P3+$D_1$ as the second transmit power. In FIG. 9, P3_2 represents the second transmit power, and the terminal device sends the second msg3 and/or the second UCI by using the second transmit power. By analogy, (P3_$k$–1) in FIG. 9 represents actual transmit power of the msg3 and/or the UCI in the (k–1)th random access attempt, and P3_$k$ represents actual transmit power of the msg3 and/or the UCI in the kth random access attempt; and so on, until the terminal device succeeds in random access, or a random access attempt quantity of the terminal device reaches a specified maximum random access attempt quantity at the coverage enhancement level 0. The maximum random access attempt quantity of the terminal device at the coverage enhancement level 0 may be preset by the network device or specified by a protocol.

FIG. 9 uses an example in which the first random access attempt is the first-time random access attempt, and the second random access attempt is the second-time random access attempt. In actual, the first random access attempt may be any random access attempt in FIG. 9, and the second random access attempt may be a next random access attempt after the first random access attempt in FIG. 9. Certainly, if the first random access attempt is not the first-time random access attempt in a random access procedure, the first power ramping step may be not 0.

The first power ramping step and the second power ramping step may be specified by a protocol or may be indicated by the network device. The first power ramping step and the second power ramping step are used to determine the transmit power of the msg3 and/or the UCI. The first power ramping step and the second power ramping step may be equal or may not be equal. For example, the second power ramping step may be greater than the first power ramping step, that is, the transmit power of the msg3 and/or the UCI may ramp up with the random access attempt quantity, so as to increase a sending success rate of the msg3 and/or the UCI.

When the coverage enhancement level of the terminal device is the coverage enhancement level 0, in different random access attempt processes, after the msg1 is sent and the msg2 is received, the transmit power of the msg3 or the UCI may ramp up with the random access attempt quantity. Ramping up the transmit power of the msg3 or calculating the transmit power of the msg3 based on the power control parameter helps the terminal device to complete the random access procedure more quickly and reduce power consumption of the terminal device.

The foregoing describes several manners of determining the actual transmit power of the msg3 or the UCI. In actual application, a specific manner may be determined and selected according to a stipulation of a protocol, or a specific manner may be determined and selected according to an indication of the network device.

In addition, a terminal device of a new version and a terminal device of an old version are currently available, for example, R14 is a terminal device of a new version, and R13 is a terminal device of an old version. The terminal device of the new version is capable of implementing the solution provided in the embodiment shown in FIG. 4, and the terminal device of the old version may be incapable of implementing the solution provided in the embodiment shown in FIG. 4. In view of this, it may be considered that only the terminal device of the new version is allowed to implement the solution provided in the embodiment shown in FIG. 4, and the terminal device of the old version may continue to determine the transmit power of the msg3 and/or the UCI in the prior-art manner.

Therefore, this embodiment of this application provides third indication signaling. The third indication signaling is configured by a network device of the new version, such as an R14 network device. After configuring the third indication signaling, the network device may send the third indication signaling. For example, the third indication signaling may be sent in a broadcast manner and may be received and identified by the terminal device of the new version. The terminal device of the old version may be incapable of receiving the third indication signaling, or may be incapable of identifying the third indication signaling. The third indication signaling is used to instruct the terminal device to determine the transmit power of the msg3 and/or the UCI by using the technical solutions provided in the embodiments of this application. Therefore, a terminal device that receives and successfully parses the third indication signaling may determine the transmit power of the msg3 and/or the UCI by using the technical solutions provided in the embodiments of this application. A terminal device that does not receive the third indication signaling or fails to parse the third indication signaling continues to determine the transmit power of the msg3 and/or the UCI by using the prior-art solution. The third indication signaling can be used to provide different instructions for the terminal device of the new version and the terminal device of the old version, so that terminal devices of different versions determine the transmit power of the msg3 and/or the UCI in different manners, which complies with actual configuration of the terminal devices. The technical solutions provided in the embodiments of this application herein include the solution provided in the embodiment shown in FIG. 4.

In this embodiment of this application, when making a random access attempt at the coverage enhancement level 0, the terminal device may determine the first transmit power based on the first power control parameter and/or the transmit power of the first random access preamble message; in other words, determine the transmit power of the first transmission message and/or the first uplink control message based on an actual situation. In addition, the second transmit power determined by the terminal device in the second random access attempt is greater than or equal to the first transmit power determined by the terminal device in the first random access attempt, and the transmit power of the msg3 and/or the UCI ramps up gradually. This increases the sending success rate of the msg3 and/or the UCI and accelerates the random access procedure.

In addition, in the prior art, when the coverage enhancement level of the terminal device is the coverage enhancement level 0, the terminal device attempts to send the msg1 in a manner of gradually ramping up initial transmit power. For example, when the terminal device makes the first-time random access attempt, the terminal device calculates transmit power of the msg1, namely, initial transmit power of the msg1, based on the power control parameter, and sends the msg1 according to the initial transmit power. When the terminal device makes the second-time random access attempt, the terminal device ramps up the transmit power of the msg1 on a basis of the transmit power of the msg1 in the first-time random access attempt, and sends the msg1 according to a ramped-up transmit power. When the terminal device makes the third-time random access attempt, the terminal device ramps up the transmit power of the msg1 again on a basis of the transmit power of the msg1 in the second-time random access attempt, and sends the msg1 according to the further ramped-up transmit power, and by analogy, until the terminal device succeeds in random access, or the random access attempt quantity of the terminal device reaches a specified maximum random access attempt quantity at the coverage enhancement level 0. If the terminal device fails to gain access always, the terminal device continuously makes random access attempts before the random access attempt quantity reaches the specified maximum random access attempt quantity. In each random access attempt, the terminal device sends the msg1, and as the random access attempt quantity increases, the terminal device may use the maximum transmit power of the terminal device to send the msg1. Alternatively, if the random access attempt quantity of the terminal device reaches the specified maximum random access attempt quantity at the coverage enhancement level 0, the coverage enhancement level of the terminal device may be switched from the coverage enhancement level 0 to a coverage enhancement level 1. If the terminal device fails in random access at the coverage enhancement level 0, the terminal device sends the msg1 by directly using the maximum transmit power of the terminal device at the coverage enhancement level 1. If the random access attempt quantity of the terminal device reaches a specified maximum random access attempt quantity at the coverage enhancement level 1, the coverage enhancement level of the terminal device is switched from the coverage enhancement level 1 to a coverage enhancement level 2. If the terminal device fails in random access at the coverage enhancement level 1, the terminal device sends the msg1 by directly using the maximum transmit power of the terminal device at the coverage enhancement level 2. After sending the msg1, the terminal device receives the msg2 from the network device. If the msg1 is sent by using the maximum transmit power of the terminal device, for example, the terminal device is at the coverage enhancement level 1 or the coverage enhancement level 2, a value indicated by the repetition carried in the msg2 is relatively large and usually is greater than 2, and the terminal device sends the msg3 by using the maximum transmit power of the terminal device. A case for the UCI is similar. If the msg1 is sent by using the maximum transmit power of the terminal device, a value indicated by the repetition carried in the msg4 is usually greater than 2, and the terminal device sends the UCI by using the maximum transmit power of the terminal device.

However, the terminal device is relatively close to the network device, and the initial transmit power of the msg1 is relatively low. At the coverage enhancement level 0, sending the msg1 still fails as the transmit power ramps up gradually. After the coverage enhancement level 0 is switched to the coverage enhancement level 1, the maximum transmit power is used to transmit the msg3 and/or the UCI. Alternatively, the terminal device cannot successfully send the msg1 not necessarily because signal quality is poor, but because the terminal device is in a contention environment when sending the msg1, and the terminal device may obtain fewer resources through contention at the coverage enhancement level 0. Therefore, even if the power of sending the msg1 by the terminal device is sufficient, sending the msg1 may still fail. The coverage enhancement level of the terminal device is switched from the coverage enhancement level 0 to the coverage enhancement level 1. In this case, the network device can only know that the terminal device is at the coverage enhancement level 1. However, the terminal device is no longer in the contention environment when sending the msg3 and/or the UCI, and may successfully send the msg3 and/or the UCI without using the maximum transmit power of the terminal device. However, if a value indicated by a repetition configured by the network device is relatively large and is greater than 2 for example, the maximum transmit power of the terminal device is definitely used in the prior-art solution to send the msg3 and/or the UCI in this case. Very high signal transmit power causes an unnecessary system noise floor increase, interferes with another terminal device, even affects an uplink sending process of the entire base station, and increases power consumption of the terminal device itself.

Figure 10:
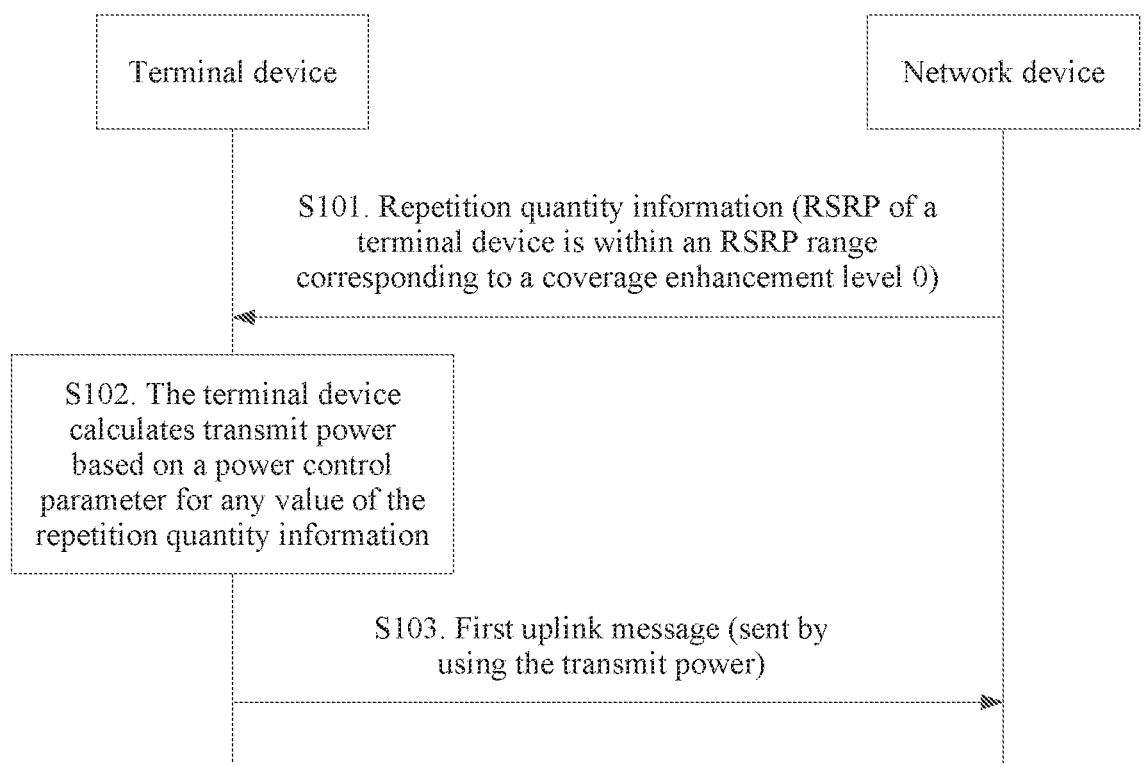
FIG. 10 is a flowchart of a message transmission method according to an embodiment of this application.

In view of this, an embodiment of this application further provides a message transmission method, which can resolve the problem. Referring to FIG. 10, a procedure of the method is described as follows: In the following description process, for example, the technical solution provided in this embodiment of this application is applied to the application scenario shown in FIG. 3, and in actual application, certainly the technical solution is not limited thereto.

S101. When RSRP of a terminal device is within an RSRP range corresponding to a coverage enhancement level 0, the terminal device receives first indication signaling from a network device, where the first indication signaling is used to indicate repetition quantity information. Naturally, the network device needs to first send the first indication signaling to the terminal device, where the repetition quantity information indicates a repetition quantity of a first uplink message, and the first uplink message includes a third message or a feedback message for a fourth message (that is, the first uplink message includes a msg3 or UCI) in a random access attempt.

S102. The terminal device calculates transmit power based on a power control parameter for any value of the repetition quantity information.

S103. The terminal device sends the first uplink message to the network device by using the transmit power, and the network device receives the first uplink message sent by the terminal device by using the transmit power.

It should be noted that the power control parameter in the embodiment shown in FIG. 10 is not a same concept as the first power control parameter or the second power control parameter in the embodiment shown in FIG. 4. The power control parameter in the embodiment shown in FIG. 10 is a general name of power control parameters used in all random access attempts. In addition, the first indication signaling in the embodiment shown in FIG. 10 and the first indication signaling in the embodiment shown in FIG. 4 are not same signaling. The first indication signaling in the embodiment shown in FIG. 10 is used to indicate the repetition quantity information, and the first indication signaling in the embodiment shown in FIG. 4 is used to indicate the first power control parameter.

In addition, for S101. FIG. 10 shows that the network device sends the repetition quantity information to the terminal device, meaning that the network device sends the first indication signaling to the terminal device, where the first indication signaling is used to indicate the repetition quantity information.

The network device may determine the repetition quantity information. After determining the repetition quantity information, the network device may send the first indication signaling to the terminal device, where the first indication signaling is used to indicate the repetition quantity information. For example, in this embodiment, the first indication signaling may be implemented by using a msg2 or a msg4, and the repetition quantity information may be implemented by using a repetition.

In this embodiment of this application, the RSRP of the terminal device is within the RSRP range corresponding to the coverage enhancement level 0, that is, a coverage enhancement level of the terminal device is the coverage enhancement level 0, herein indicating that the terminal device makes an initial random access attempt at the coverage enhancement level 0. It may be understood as follows: In the first-time random access attempt in a random access procedure, the terminal device is at the coverage enhancement level 0, that is, a range of NRSRP or RSRP of the terminal device is an NRSRP or RSRP range corresponding to the coverage enhancement level 0.

The terminal device makes the initial random access attempt at the coverage enhancement level 0. In any random access attempt after the initial random access attempt, regardless of a current coverage enhancement level of the terminal device, if a repetition carried in a msg2 (or a msg4) sent by the network device instructs the terminal device to send the msg3 (or the UCI) according to maximum transmit power of the terminal device, it may be improper. It may be learned from the foregoing analysis that, very high signal transmit power causes an unnecessary system noise floor increase, interferes with another terminal device, even affects an uplink sending process of an entire base station, and increases power consumption of the terminal device itself. Therefore, for the terminal device that makes the initial random access attempt at the coverage enhancement level 0, the coverage enhancement level of the terminal device is not limited in any random access attempt after the initial random access attempt, that is, in any random access attempt after the initial random access attempt, the terminal device may continue to be at the coverage enhancement level 0, or at a coverage enhancement level 1, or at a coverage enhancement level 2. Alternatively, it may be understood as follows: Any terminal device that makes an initial random access attempt at the coverage enhancement level 0 may execute the technical solution shown in FIG. 10, and when executing the technical solution shown in FIG. 10, the terminal device may continue to be at the coverage enhancement level 0, the coverage enhancement level 1, or the coverage enhancement level 2.

The following separately describes how the terminal device makes the initial random access attempt at the coverage enhancement level 0, and how the terminal device makes at least one random access attempt at the coverage enhancement level 0, the coverage enhancement level 1, or the coverage enhancement level 2. The at least one random access attempt herein is a subsequent random access attempt after the initial random access attempt.

The terminal device makes the initial random access attempt at the coverage enhancement level 0. In the initial random access attempt, the network device determines the repetition quantity information. To distinguish between different random access attempts, the repetition quantity information in the initial random access attempt is referred to as first repetition quantity information in this specification. After determining the first repetition quantity information, the network device sends first indication signaling to the terminal device, and similarly, for differentiation, the first indication signaling in the initial random access attempt is referred to as first indication signaling A in this specification. Then, the terminal device receives the first indication signaling A from the network device, and the terminal device may determine the first repetition quantity information indicated by the first indication signaling A. The terminal device may calculate transmit power based on an initial power control parameter for any value of the first repetition quantity information, and the transmit power is referred to as first transmit power. Herein, the terminal device does not determine the value of the first repetition quantity information, but directly uses the initial power control parameter to calculate the first transmit power. The initial power control parameter is a power control parameter used in the initial random access attempt. Then, the terminal device sends the msg3 and/or the UCI to the network device by using the first transmit power, and the network device may receive the msg3 and/or the UCI transmitted by the terminal device by using the first transmit power.

The terminal device makes at least one random access attempt at the coverage enhancement level 0, the coverage enhancement level 1, or the coverage enhancement level 2. In each of the at least one random access attempt, the network device determines repetition quantity information. To distinguish between different random access attempts, repetition quantity information in one random access attempt in the at least one random access attempt is referred to as second repetition quantity information in this specification. After determining the second repetition quantity information, the network device sends first indication signaling to the terminal device, and similarly, for differentiation, the first indication signaling in the random access attempt in the at least one random access attempt is referred to as first indication signaling B in this specification. Then, the terminal device receives the first indication signaling B from the network device, and the terminal device may determine the second repetition quantity information indicated by the first indication signaling B. The terminal device may calculate transmit power based on a power control parameter corresponding to the random access attempt for any value of the second repetition quantity information, and the transmit power is referred to as second transmit power. Herein, the terminal device does not determine the value of the second repetition quantity information, but directly uses the power control parameter corresponding to the random access attempt to calculate the second transmit power. The power control parameter corresponding to the random access attempt is a power control parameter used in the random access attempt. Then, the terminal device sends the msg3 and/or the UCI to the network device by using the second transmit power, and the network device may receive the msg3 and/or the UCI transmitted by the terminal device by using the second transmit power.

A reason why the terminal device switches from the coverage enhancement level 0 to the coverage enhancement level 1 or from the coverage enhancement level 1 to the coverage enhancement level 2 in a random access attempt, or why the terminal device sends the msg3 according to the maximum transmit power of the terminal device at the coverage enhancement level 0 may be that resource allocation at the coverage enhancement level 0 is improper. Therefore, in a case without considering contention, at the time of sending the msg3 and/or the UCI, it is more proper to calculate the transmit power by using an open loop power control method (also referred to as an open loop calculation method). That is, it is more proper to calculate the transmit power based on the power control parameter. Therefore, in this embodiment of this application, regardless of a value indicated by a repetition configured by the network device for the msg3 and/or the UCI, the terminal device may calculate the transmit power of the msg3 and/or the UCI based on the power control parameter. That is, in this embodiment of this application, when the coverage enhancement level of the terminal device is the coverage enhancement level 0 at the time of initial access, a manner in which the terminal device determines actual transmit power of the msg3 and/or the UCI is independent of the repetition. Regardless of the value indicated by the repetition, the terminal device calculates the actual transmit power of the msg3 and/or the UCI based on the power control parameter. Therefore, in S102, there is no determining process, that is, after receiving the repetition quantity from the network device, the terminal device does not determine a value of the repetition quantity, but directly calculates the actual transmit power of the msg3 and/or the UCI based on the power control parameter.

Specifically, the terminal device may determine the transmit power calculated based on the power control parameter as the actual transmit power of the msg3 and/or the UCI.

That is, the actual transmit power of the msg3 and/or the UCI is directly calculated based on the power control parameter, which is relatively simple. The power control parameter may be indicated by the network device. For example, the network device may determine the power control parameter. After determining the power control parameter, the network device sends second indication signaling to the terminal device, where the second indication signaling is used to indicate the power control parameter. The power control parameter includes at least one of the following parameters: maximum transmit power of the terminal device, target preamble received power, a downlink path loss, preamble initial received target power, a power offset, a preamble attempt quantity, a power ramping step, a quantity of preamble sending repetitions, a power offset of the third message in the random access attempt relative to a preamble, a path loss conversion proportionality coefficient, and a transmission bandwidth parameter. The power ramping step herein may be equivalent to the third power ramping step described in the embodiment shown in FIG. 4.

For a manner of calculating the transmit power by the terminal device based on the power control parameter, refer to related descriptions in the embodiment shown in FIG. 4. Details are not described again. The power control parameter may be obtained by the terminal device by receiving a system message and/or higher layer signaling sent by the network device, and the higher layer signaling is, for example, RRC signaling.

Figure 11:
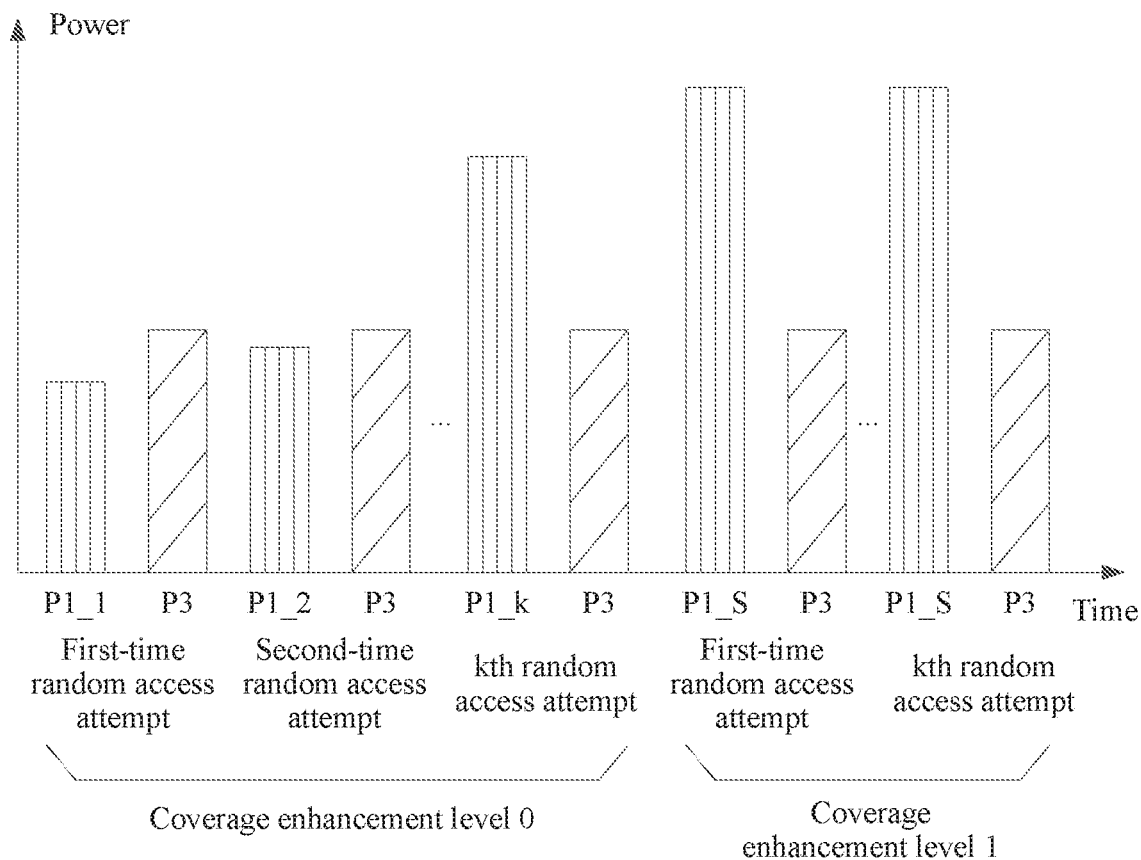
FIG. 11 is a schematic diagram of sending a msg3 and/or UCI by a terminal device according to determined transmit power according to an embodiment of this application.

Reference may be made to FIG. 11, which shows k random access attempts of the terminal device at the coverage enhancement level 0 and k random access attempts made at the coverage enhancement level 1. A rectangle with vertical lines represents transmit power of the msg1, and a rectangle with slashes represents transmit power of the msg3 and/or the UCI that is calculated based on the power control parameter, namely, actual transmit power of the msg3 and/or the UCI. The terminal device makes the first k random access attempts at the coverage enhancement level 0, and k is a maximum random access attempt quantity specified at the coverage enhancement level 0. In a process of the k random access attempts at the coverage enhancement level 0, the terminal device fails to access the network device. When the random access attempt quantity at the coverage enhancement level 0 reaches k, the terminal device switches to the coverage enhancement level 1, and resends the msg1 at the coverage enhancement level 1, where k is the maximum random access attempt quantity at the coverage enhancement level 0. In this case, the terminal device sends the msg1 by using the maximum transmit power of the terminal device. In FIG. 11, the maximum transmit power of the terminal device is represented by P1_S. Therefore, the value indicated by the repetition carried in the msg2 sent by the network device or the value indicated by the repetition carried in the msg4 sent by the network device may be greater than 2. However, it may be learned from FIG. 11 that, according to the solution provided in this embodiment of this application, the terminal device does not send the msg3 and/or the UCI according to the maximum transmit power of the terminal device; instead, the terminal device continues to calculate the actual transmit power of the msg3 based on the power control parameter and/or calculates the actual transmit power of the UCI based on the power control parameter. FIG. 11 uses an example in which the current coverage enhancement level of the terminal device is the coverage enhancement level 0 or the coverage enhancement level 1. A case is the same when the current coverage enhancement level of the terminal device is the coverage enhancement level 2, and no further example is provided.

In this embodiment of this application, the terminal device makes the initial random access at the coverage enhancement level 0, and after random access fails at the coverage enhancement level 0, the terminal device switches to the coverage enhancement level 1, or if random access still fails at the coverage enhancement level 1, the terminal device may switch to the coverage enhancement level 2. Therefore, a terminal device that makes initial random access at the coverage enhancement level 0 may not directly use maximum transmit power of the terminal device to send an uplink signal, so that interference to other uplink transmission can be reduced, and power consumption of the terminal device can also be reduced.

A terminal device of a new version and a terminal device of an old version are currently available, for example, R14 is a terminal device of a new version, and R13 is a terminal device of an old version. The terminal device of the new version is capable of implementing the solution provided in the embodiment shown in FIG. 10 (certainly is capable of implementing the solution provided in the embodiment shown in FIG. 4), and the terminal device of the old version may be incapable of implementing the solution provided in the embodiment shown in FIG. 10. The terminal device of the old version may be or may not be capable of implementing the solution provided in the embodiment shown in FIG. 4, which has been described in the embodiment shown in FIG. 4. Whether the terminal device of the old version is capable of implementing the solution provided in the embodiment shown in FIG. 10 is mainly described herein. Therefore, in this embodiment of this application, the network device may instruct, by using signaling, terminal devices of different versions whether to implement the solution provided in the embodiment shown in FIG. 10.

For example, the network device may configure two pieces of signaling: first signaling and second signaling, and both the first signaling and the second signaling are used to indicate a maximum random access attempt quantity of the terminal device, that is, the first signaling and the second signaling are used to indicate how many random access attempts can be made by the terminal device at most. The first signaling is used to indicate a terminal device of a first version, and the second signaling is used to indicate a terminal device of a second version. The terminal device of the first version is, for example, the terminal device of the old version, and the terminal device of the second version is, for example, the terminal device of the new version. The terminal device of the old version can receive and identify the first signaling, and the terminal device of the new version can receive and identify the second signaling. There is a case in which if the network device sends the first signaling and the second signaling in a broadcast manner, the terminal device of the old version may be incapable of receiving or identifying the second signaling, but the terminal device of the new version may be capable of receiving and identifying the first signaling in addition to the second signaling. Therefore, it is specified in this embodiment of this application that, if the terminal device receives and identifies the first signaling and the second signaling, the terminal device executes an instruction of the second signaling and ignores the first signaling. For example, the first signaling and the second signaling are in different formats, and the terminal device of the new version may determine, through parsing, which signaling is the second signaling.

Specifically, the first signaling may indicate at least one of a total maximum random access attempt quantity, a maximum random access attempt quantity at the coverage enhancement level 0, a maximum random access attempt quantity at the coverage enhancement level 1, and a maximum random access attempt quantity at the coverage enhancement level 2 that are of the terminal device of the first version. The total maximum random access attempt quantity is used to indicate how many random access attempts can be made by the terminal device at all coverage enhancement levels. The maximum random access attempt quantity at the coverage enhancement level 0 is used to indicate how many random access attempts can be made by the terminal device at the coverage enhancement level 0. The maximum random access attempt quantity at the coverage enhancement level 1 is used to indicate how many random access attempts can be made by the terminal device at the coverage enhancement level 1. The maximum random access attempt quantity at the coverage enhancement level 2 is used to indicate how many random access attempts can be made by the terminal device at the coverage enhancement level 2.

Optionally, a value of the total maximum random access attempt quantity of the terminal device that is indicated by the first signaling is less than or equal to a value of the maximum random access attempt quantity that is at the coverage enhancement level 0 and that is indicated by the first signaling. It may be understood as follows: The network device indicates that when the terminal device of the old version makes initial random access at the coverage enhancement level 0, the terminal device can work only at the coverage enhancement level 0, and cannot switch to the coverage enhancement level 1 or the coverage enhancement level 2. Because the terminal device of the old version may be incapable of implementing the solution provided in the embodiment shown in FIG. 10, after switching to the coverage enhancement level 1 or the coverage enhancement level 2, the terminal device of the old version sends the msg3 and/or the UCI in the prior-art manner, that is, the terminal device may send the msg3 and/or the UCI according to the maximum transmit power of the terminal device, which consequently brings relatively large noise, affects another terminal device in the system, and increases power consumption of the terminal device. Therefore, in this embodiment of this application, work of the terminal device of the old version may be limited, so that the terminal device of the old version works only at the coverage enhancement level 0, thereby avoiding these problems.

The second signaling may indicate at least one of a total maximum random access attempt quantity, a maximum random access attempt quantity at the coverage enhancement level 0, a maximum random access attempt quantity at the coverage enhancement level 1, and a maximum random access attempt quantity at the coverage enhancement level 2 that are of the terminal device of the second version. The total maximum random access attempt quantity is used to indicate how many random access attempts can be made by the terminal device at all coverage enhancement levels. The maximum random access attempt quantity at the coverage enhancement level 0 is used to indicate how many random access attempts can be made by the terminal device at the coverage enhancement level 0. The maximum random access attempt quantity at the coverage enhancement level 1 is used to indicate how many random access attempts can be made by the terminal device at the coverage enhancement level 1. The maximum random access attempt quantity at the coverage enhancement level 2 is used to indicate how many random access attempts can be made by the terminal device at the coverage enhancement level 2.

Optionally, a value of the total maximum random access attempt quantity indicated by the second signaling is greater than a value of the maximum random access attempt quantity that is at the coverage enhancement level 0 and that is indicated by the second signaling, and the value of the total maximum random access attempt quantity carried in the second signaling is less than or equal to a sum of the value of the maximum random access attempt quantity that is at the coverage enhancement level 0 and that is carried in the second signaling, a value of the maximum random access attempt quantity that is at the coverage enhancement level 1 and that is carried in the second signaling, and a value of the maximum random access attempt quantity that is at the coverage enhancement level 2 and that is carried in the second signaling. It may be understood as follows: The network device indicates that when the terminal device of the new version makes initial random access at the coverage enhancement level 0, the terminal device can work both at the coverage enhancement level 0 and the coverage enhancement level 1 or the coverage enhancement level 2. Because the terminal device of the new version may implement the solution provided in the embodiment shown in FIG. 10, after the terminal device of the new version switches to the coverage enhancement level 1 or the coverage enhancement level 2, the terminal device can send the msg3 and/or the UCI according to the solution provided in the embodiment shown in FIG. 10, and does not send an uplink signal by directly using the maximum transmit power of the terminal device, so that interference to other uplink transmission can be reduced, and power consumption of the terminal device can also be reduced.

Certainly, values of parameters indicated by the first signaling and values of parameters indicated by the second signaling may be configured by the network device. Therefore, the foregoing description of the values of the parameters indicated by the first signaling and the values of the parameters indicated by the second signaling is merely an example, and this embodiment of this application does not limit the values of the parameters indicated by the first signaling and/or the values of the parameters indicated by the second signaling.

By configuring the first signaling and the second signaling, the network device may make the technical solution provided in this embodiment of this application compatible with the terminal device of the old version and the terminal device of the new version.

The embodiment shown in FIG. 4 and the embodiment shown in FIG. 10 described above may be separately applied, or may be combined for application. For example, in the embodiment shown in FIG. 4, if the value indicated by the repetition is relatively small, less than 2 for example, the transmit power of the msg3 and/or the UCI is determined according to the solution provided in the embodiment shown in FIG. 4; or if the value indicated by the repetition is relatively large, greater than 2 for example, the msg3 and/or the UCI are/is sent according to the maximum transmit power of the terminal device. However, if the embodiment shown in FIG. 4 is combined with the embodiment shown in FIG. 10, if the value indicated by the repetition is relatively large, greater than 2 for example, the transmit power of the msg3 and/or the UCI is determined according to the solution provided in the embodiment shown in FIG. 10; or if the value indicated by repetition is relatively small, less than 2 for example, the transmit power of the msg3 and/or the UCI may be determined according to the solution provided in the embodiment shown in FIG. 4, or the transmit power of the msg3 and/or the UCI may be determined according to the solution provided in the embodiment shown in FIG. 10. Specifically, whether the embodiment shown in FIG. 4 and the embodiment shown in FIG. 10 are separately applied or combined for application is not limited in this embodiment of this application.

Devices provided in the embodiments of this application are described below with reference to the accompanying drawings.

Figure 12:
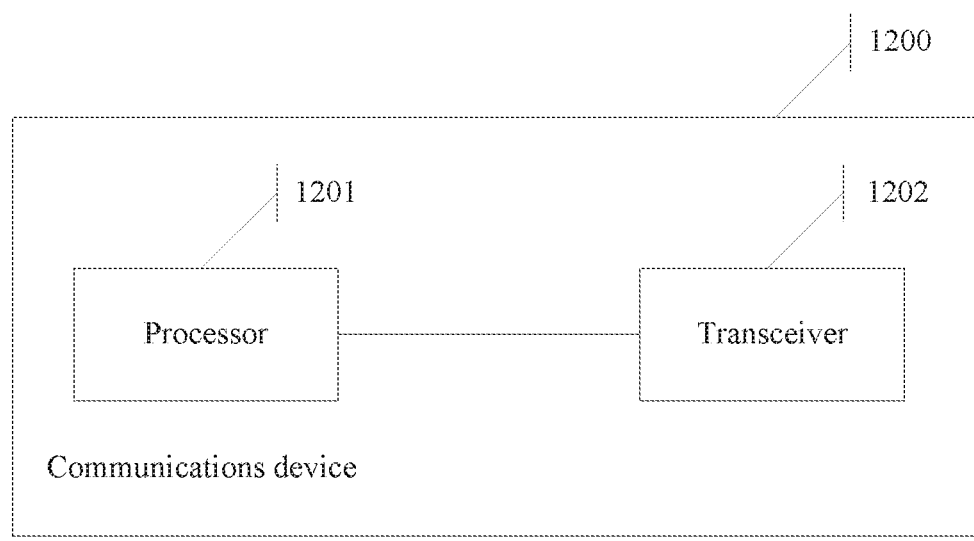
FIG. 12 is a schematic structural diagram of a communications device according to an embodiment of this application.

FIG. 12 is a schematic structural diagram of a communications device 1200. The communications device 1200 may implement functions of the terminal device in the foregoing. The communications device 1200 may be the terminal device described above, or may be a chip disposed in the terminal device described above. The communications device 1200 may include a processor 1201 and a transceiver 1202. The processor 1201 may be configured to perform S41, S43, and S44 in the embodiment shown in FIG. 4, and/or support another process of the technology described in this specification. The transceiver 1202 may be configured to perform S42 and S45 in the embodiment shown in FIG. 4, and/or support another process of the technology described in this specification.

For example, the processor 1201 is configured to make a first random access attempt at a coverage enhancement level 0, where the first random access attempt includes determining first transmit power based on a first power control parameter and/or transmit power of a first random access preamble message, and the first random access preamble message is a random access preamble message in the first random access attempt.

The transceiver 1202 is configured to send a first transmission message and/or a first uplink control message to a network device by using the first transmit power, where the first transmission message is a third message in the first random access attempt, and the first uplink control message is a feedback message for a fourth message in the first random access attempt.

The processor 1201 is configured to make a second random access attempt at the coverage enhancement level 0, where the second random access attempt is a next random access attempt made by the communications device after the first random access attempt fails.

The processor 1201 is configured to complete determining second transmit power based on a second power control parameter and/or transmit power of a second random access preamble message, which is included in the second random access attempt, where the second random access preamble message is a random access preamble message in the second random access attempt, and the determining second transmit power includes determining that the second transmit power is greater than or equal to the first transmit power.

The transceiver 1202 is configured to send a second transmission message and/or a second uplink control message to the network device by using the second transmit power, where the second transmission message is a third message in the second random access attempt, and the second uplink control message is a feedback message for a fourth message in the second random access attempt.

All related content of each step in the foregoing method embodiment may be cited in function descriptions of a corresponding function module, and details are not described herein.

Figure 13:
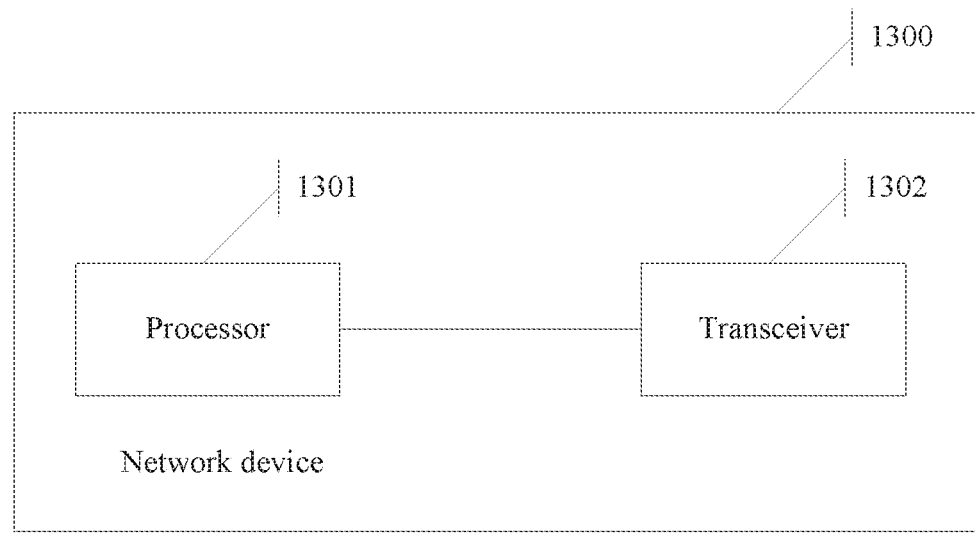
FIG. 13 is a schematic structural diagram of a network device according to an embodiment of this application.

FIG. 13 is a schematic structural diagram of a network device 1300. The network device 1300 may implement functions of the network device in the foregoing. The network device 1300 may be the network device described above, or may be a chip disposed in the network device described above. The network device 1300 may include a transceiver 1302, and optionally, the network device 1300 may further include a processor 1301. The processor 1301 may be configured to perform processes such as determining the first power control parameter and the second power control parameter in the embodiment shown in FIG. 4, and/or support another process of the technology described in this specification. The transceiver 1302 may be configured to perform S42 and S45 in the embodiment shown in FIG. 4, and/or support another process of the technology described in this specification.

For example, the transceiver 1302 is configured to receive a first transmission message and/or a first uplink control message sent by a communications device by using first transmit power at a coverage enhancement level 0, where the first transmit power is determined by the communications device based on a first power control parameter and/or transmit power of a first random access preamble message in a first random access attempt, the first transmission message is a third message in the first random access attempt, the first uplink control message is a feedback message for a fourth message in the first random access attempt, and the first random access preamble message is a random access preamble message in the first random access attempt.

The transceiver 1302 is further configured to receive a second transmission message and/or a second uplink control message sent by the communications device by using second transmit power at the coverage enhancement level 0, where the second transmit power is determined by the communications device based on a second power control parameter and/or transmit power of a second random access preamble message in a second random access attempt, the second transmit power is greater than or equal to the first transmit power, the second random access attempt is a next random access attempt made by the communications device after the first random access attempt fails, the second transmission message is a third message in the second random access attempt, the second uplink control message is a feedback message for a fourth message in the second random access attempt, and the second random access preamble message is a random access preamble message in the second random access attempt.

All related content of each step in the foregoing method embodiment may be cited in function descriptions of a corresponding function module, and details are not described herein.

Figure 14:
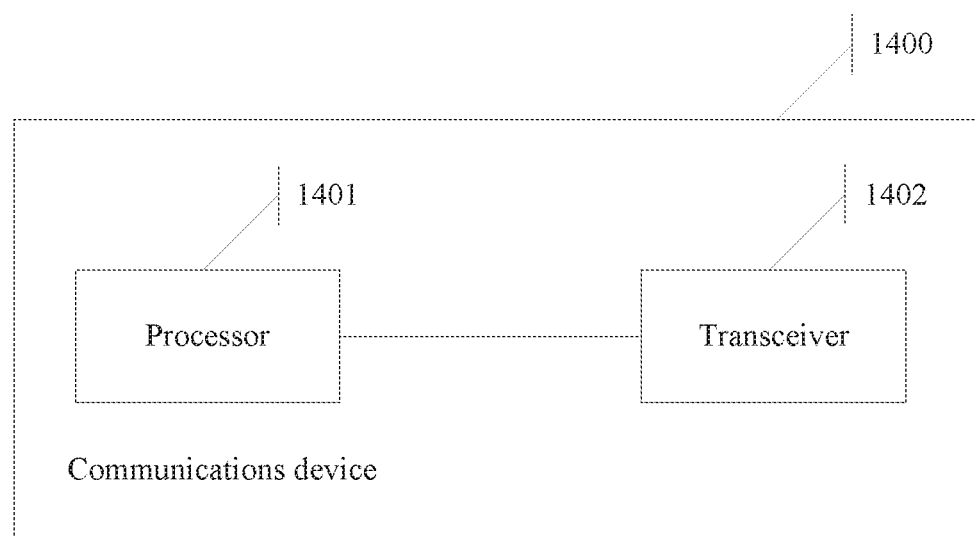
FIG. 14 is a schematic structural diagram of a communications device according to an embodiment of this application.

FIG. 14 is a schematic structural diagram of a communications device 1400. The communications device 1400 may implement functions of the terminal device in the foregoing. The communications device 1400 may be the terminal device described above, or may be a chip disposed in the terminal device described above. The communications device 1400 may include a processor 1401 and a transceiver 1402. The processor 1401 may be configured to perform S102 in the embodiment shown in FIG. 10, and/or support another process of the technology described in this specification. The transceiver 1402 may be configured to perform S101 and S103 in the embodiment shown in FIG. 10, and/or support another process of the technology described in this specification.

For example, the transceiver 1402 is configured to: when RSRP of the communications device 1400 is within an RSRP range corresponding to a coverage enhancement level 0, receive repetition quantity information from a network device, where the repetition quantity information indicates a repetition quantity of a first uplink message, and the first uplink message includes a third message or a feedback message for a fourth message in a random access attempt.

The processor 1401 is configured to calculate transmit power based on a power control parameter for any value of the repetition quantity information.

The transceiver 1402 is further configured to send the first uplink message to the network device by using the transmit power.

All related content of each step in the foregoing method embodiment may be cited in function descriptions of a corresponding function module, and details are not described herein.

Figure 15:
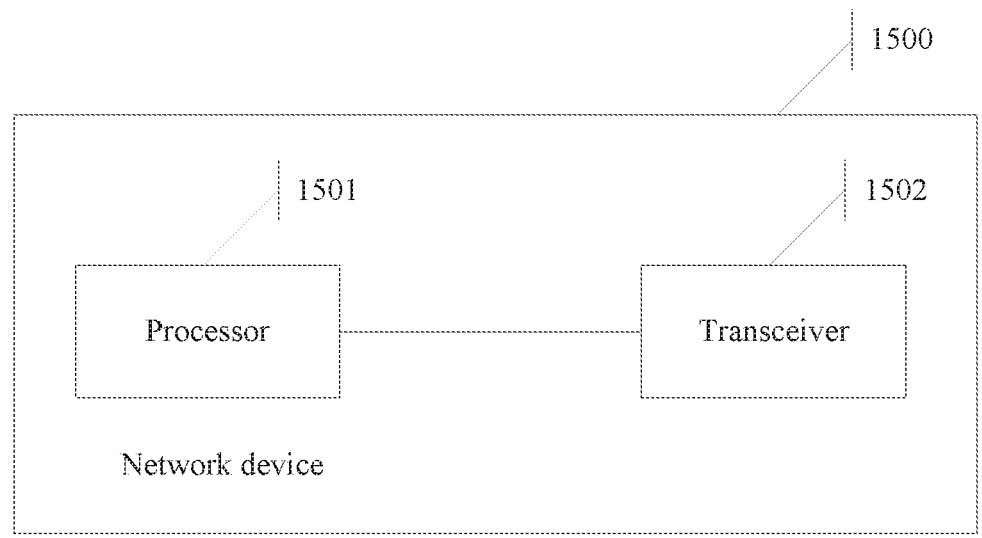
FIG. 15 is a schematic structural diagram of a network device according to an embodiment of this application.

FIG. 15 is a schematic structural diagram of a network device 1500. The network device 1500 may implement functions of the network device in the foregoing. The network device 1500 may be the network device described above, or may be a chip disposed in the network device described above. The network device 1500 may include a processor 1501 and a transceiver 1502. The processor 1501 may be configured to perform a process such as determining the repetition quantity information in the embodiment shown in FIG. 10, and/or support another process of the technology described in this specification. The transceiver 1502 may be configured to perform S101 and S103 in the embodiment shown in FIG. 10, and/or support another process of the technology described in this specification.

For example, the transceiver 1502 is configured to send first indication signaling to a communications device, where the first indication signaling is used to indicate repetition quantity information, the repetition quantity information indicates a repetition quantity of a first uplink message, and the first uplink message includes a third message or a feedback message for a fourth message in a random access attempt.

The transceiver 1502 is further configured to receive the first uplink message sent by the communications device by using transmit power, where the transmit power is calculated by the communications device based on the power control parameter for any value of the repetition quantity information.

All related content of each step in the foregoing method embodiment may be cited in function descriptions of a corresponding function module, and details are not described herein.

Figure 16A:
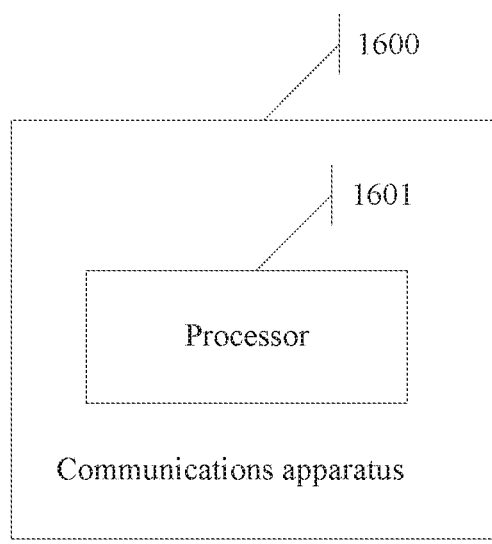
FIG. 16A and FIG. 16B are two schematic structural diagrams of a communications apparatus according to an embodiment of this application.

In a simple embodiment, a person skilled in the art may consider that the communications device 1200, the network device 1300, the communications device 1400, or the network device 1500 may be further implemented by using a structure of a communications apparatus 1600 shown in FIG. 16A. The communications apparatus 1600 may implement functions of the network device or the communications device in the foregoing. The communications apparatus

1600 may include a processor 1601. When the communications apparatus 1600 is configured to implement functions of the communications device in the embodiment shown in FIG. 4, the processor 1601 may be configured to perform S41, S43, and S44 in the embodiment shown in FIG. 4, and/or support another process of the technology described in this specification. When the communications apparatus 1600 is configured to implement functions of the network device in the embodiment shown in FIG. 4, the processor 1601 may be configured to perform processes such as determining the first power control parameter and the second power control parameter in the embodiment shown in FIG. 4, and/or support another process of the technology described in this specification. When the communications apparatus 1600 is configured to implement functions of the communications device in the embodiment shown in FIG. 10, the processor 1601 may be configured to perform S102 in the embodiment shown in FIG. 10, and/or support another process of the technology described in this specification. When the communications apparatus 1600 is configured to implement functions of the network device in the embodiment shown in FIG. 10, the processor 1601 may be configured to perform a process such as determining the repetition quantity information in the embodiment shown in FIG. 10, and/or support another process of the technology described in this specification.

The communications apparatus 1600 may be implemented by using a field-programmable gate array (FPGA), an application-specific integrated circuit (ASIC), a system on chip (SoC), a central processing unit (CPU), a network processor (NP), a digital signal processor (DSP), a micro control unit (MCU), a programmable logic device (PLD), or another integrated chip. The communications apparatus 1600 may be disposed in the network device or the communications device in this embodiment of this application, so that the network device or the communications device implements the message transmission method provided in the embodiment of this application.

Figure 16B:
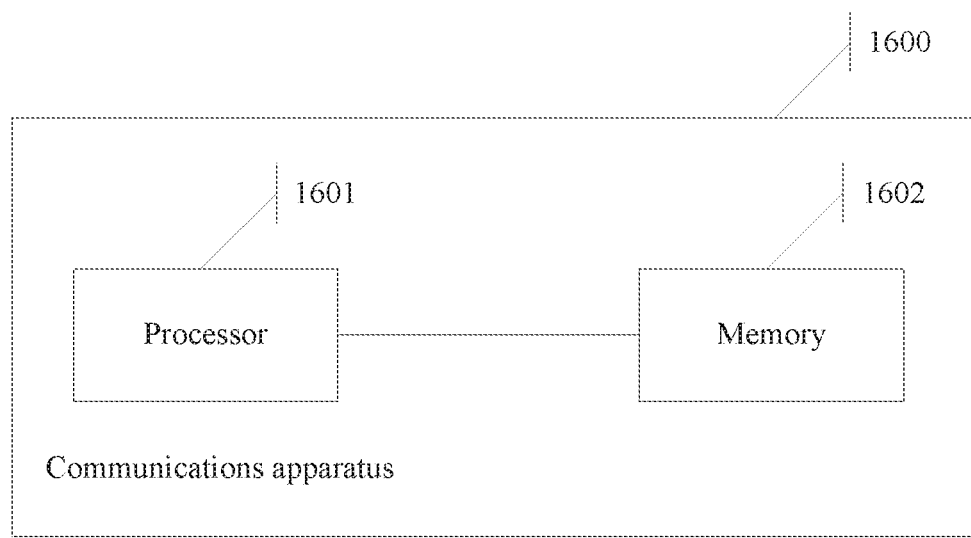

In an optional implementation, the communications apparatus 1600 may further include a memory 1602. Referring to FIG. 16B, the memory 1602 is configured to store computer programs or instructions, and the processor 1601 is configured to decode and execute these computer programs or instructions. It should be understood that these computer programs or instructions may include function programs of the foregoing network device or communications device. When the function programs of the network device are decoded and executed by the processor 1601, the network device may implement functions of the network device in the message transmission method provided in the embodiment shown in FIG. 4 or the embodiment shown in FIG. 10. When the function programs of the communications device are decoded and executed by the processor 1601, the communications device may implement functions of the terminal device in the message transmission method provided in the embodiment shown in FIG. 4 or the embodiment shown in FIG. 10.

In another optional implementation, the function programs of the network device or the communications device are stored in an external memory of the communications apparatus 1600. When the function programs of the network device are decoded and executed by the processor 1601, the memory 1602 temporarily stores some or all content of the function programs of the network device. When the function programs of the communications device are decoded and executed by the processor 1601, the memory 1602 temporarily stores some or all content of the function programs of the communications device.

In another optional implementation, the function programs of the network device or the communications device are configured in an internal memory 1602 of the communications apparatus 1600. When the function programs of the network device are stored in the internal memory 1602 of the communications apparatus 1600, the communications apparatus 1600 may be disposed in the network device in the embodiment of this application. When the function programs of the communications device are stored in the internal memory 1602 of the communications apparatus 1600, the communications apparatus 1600 may be disposed in the communications device in the embodiment of this application.

In still another optional implementation, some content of the function programs of the network device is stored in an external memory of the communications apparatus 1600, and other content of the function programs of the network device is stored in an internal memory 1602 of the communications apparatus 1600. Alternatively, some content of the function programs of the communications device is stored in an external memory of the communications apparatus 1600, and other content of the function programs of the communications device is stored in an internal memory 1602 of the communications apparatus 1600.

In this embodiment of this application, the communications device 1200, the network device 1300, the communications device 1400, the network device 1500, and the communications apparatus 1600 may be presented in a form in which each function module is divided corresponding to each function, or may be presented in a form in which each function module is divided in an integrated manner. The "module" herein may be an ASIC, a processor and a memory that execute one or more software or firmware programs, an integrated logic circuit, and/or another component that can provide the foregoing functions.

In addition, the communications device 1200 provided in the embodiment shown in FIG. 12 may further be implemented in another form. For example, the communications device includes a processing module and a transceiver module. For example, the processing module may be implemented by using the processor 1201, and the transceiver module may be implemented by using the transceiver 1202. The processing module may be configured to perform S41, S43, and S44 in the embodiment shown in FIG. 4, and/or support another process of the technology described in this specification. The transceiver module may be configured to perform S42 and S45 in the embodiment shown in FIG. 4, and/or support another process of the technology described in this specification.

For example, the processing module is configured to make a first random access attempt at a coverage enhancement level 0, where the first random access attempt includes determining first transmit power based on a first power control parameter and/or transmit power of a first random access preamble message, and the first random access preamble message is a random access preamble message in the first random access attempt.

The transceiver module is configured to send a first transmission message and/or a first uplink control message to a network device by using the first transmit power, where the first transmission message is a third message in the first random access attempt, and the first uplink control message is a feedback message for a fourth message in the first random access attempt.

The processing module is configured to make a second random access attempt at the coverage enhancement level 0, where the second random access attempt is a next random access attempt made by the communications device after the first random access attempt fails.

The processing module is configured to complete determining second transmit power based on a second power control parameter and/or transmit power of a second random access preamble message, which is included in the second random access attempt, where the second random access preamble message is a random access preamble message in the second random access attempt, and the determining second transmit power includes determining that the second transmit power is greater than or equal to the first transmit power.

The transceiver module is configured to send a second transmission message and/or a second uplink control message to the network device by using the second transmit power, where the second transmission message is a third message in the second random access attempt, and the second uplink control message is a feedback message for a fourth message in the second random access attempt.

All related content of each step in the foregoing method embodiment may be cited in function descriptions of a corresponding function module, and details are not described herein.

The network device 1300 provided in the embodiment shown in FIG. 13 may further be implemented in another form. For example, the network device includes a processing module and a transceiver module. For example, the processing module may be implemented by using the processor 1301, and the transceiver module may be implemented by using the transceiver 1302. The processing module may be configured to perform processes such as determining the first power control parameter and the second power control parameter in the embodiment shown in FIG. 4, and/or support another process of the technology described in this specification. The transceiver module may be configured to perform S42 and S45 in the embodiment shown in FIG. 4, and/or support another process of the technology described in this specification.

For example, the transceiver module is configured to receive a first transmission message and/or a first uplink control message sent by a communications device by using first transmit power at a coverage enhancement level 0, where the first transmit power is determined by the communications device based on a first power control parameter and/or transmit power of a first random access preamble message in a first random access attempt, the first transmission message is a third message in the first random access attempt, the first uplink control message is a feedback message for a fourth message in the first random access attempt, and the first random access preamble message is a random access preamble message in the first random access attempt.

The transceiver module is further configured to receive a second transmission message and/or a second uplink control message sent by the communications device by using second transmit power at the coverage enhancement level 0, where the second transmit power is determined by the communications device based on a second power control parameter and/or transmit power of a second random access preamble message in a second random access attempt, the second transmit power is greater than or equal to the first transmit power, the second random access attempt is a next random access attempt made by the communications device after the first random access attempt fails, the second transmission message is a third message in the second random access attempt, the second uplink control message is a feedback message for a fourth message in the second random access attempt, and the second random access preamble message is a random access preamble message in the second random access attempt.

All related content of each step in the foregoing method embodiment may be cited in function descriptions of a corresponding function module, and details are not described herein.

The communications device 1400 provided in the embodiment shown in FIG. 14 may further be implemented in another form. For example, the communications device includes a processing module and a transceiver module. For example, the processing module may be implemented by using the processor 1401, and the transceiver module may be implemented by using the transceiver 1402. The processing module may be configured to perform S102 in the embodiment shown in FIG. 10, and/or support another process of the technology described in this specification. The transceiver module may be configured to perform S101 and S103 in the embodiment shown in FIG. 10, and/or support another process of the technology described in this specification.

For example, the transceiver module is configured to: when RSRP of the communications device is within an RSRP range corresponding to a coverage enhancement level 0, receive repetition quantity information from a network device, where the repetition quantity information indicates a repetition quantity of a first uplink message, and the first uplink message includes a third message or a feedback message for a fourth message in a random access attempt.

The processing module is configured to calculate transmit power based on a power control parameter for any value of the repetition quantity information.

The transceiver module is further configured to send the first uplink message to the network device by using the transmit power.

All related content of each step in the foregoing method embodiment may be cited in function descriptions of a corresponding function module, and details are not described herein.

The network device 1500 provided in the embodiment shown in FIG. 15 may further be implemented in another form. For example, the network device includes a processing module and a transceiver module. For example, the processing module may be implemented by using the processor 1501, and the transceiver module may be implemented by using the transceiver 1502. The processing module may be configured to perform a process such as determining the repetition quantity information in the embodiment shown in FIG. 10, and/or support another process of the technology described in this specification. The transceiver module may be configured to perform S42 and S45 in the embodiment shown in FIG. 10, and/or support another process of the technology described in this specification.

For example, the transceiver module is configured to send first indication signaling to a communications device, where the first indication signaling is used to indicate repetition quantity information, the repetition quantity information indicates a repetition quantity of a first uplink message, and the first uplink message includes a third message or a feedback message for a fourth message in a random access attempt.

The transceiver module is further configured to receive the first uplink message sent by the communications device by using transmit power, where the transmit power is calculated by the communications device based on the power control parameter for any value of the repetition quantity information.

All related content of each step in the foregoing method embodiment may be cited in function descriptions of a corresponding function module, and details are not described herein.

Because the communications device 1200, the network device 1300, the communications device 1400, the network device 1500, and the communications apparatus 1600 provided in the embodiments of this application may be configured to perform the method provided in the embodiment shown in FIG. 4 or the embodiment shown in FIG. 10, for technical effects that can be obtained by the devices, reference may be made to the foregoing method embodiments, and details are not described herein. It should be noted that in the embodiments of this application, the communications device and the terminal device may be understood as a same concept and may be used interchangeably.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A message transmission method, comprising:
    performing, by a communications device during a random access procedure, an initial random access attempt at coverage enhancement level 0;
    receiving, by the communications device, a random access response (msg2) comprising repetition quantity information from a network device, wherein the repetition quantity information indicates a repetition quantity of a third message (msg3) in a sequence of messages comprised in the random access procedure or a feedback message of a fourth message (msg4) in the sequence of messages;
    in response to receiving the msg2, determining, by the communications device, a transmit power based on a plurality of power control parameters irrespective of the repetition quantity, wherein the plurality of power control parameters comprise: a maximum transmit power of the communications device, a downlink path loss, a preamble initial received target power, a preamble attempt quantity, a power ramping step, and a transmission bandwidth parameter; and
    sending, by the communications device, the msg3 or the feedback message of the msg4 to the network device based on the transmit power.

2. The method according to claim 1, the method further comprising:
    receiving, by the communications device with a first communications device version or with a second communications device version, first signaling and second signaling from the network device for performing a random access attempt, wherein the first signaling corresponds to the first communications device version, and the second signaling corresponds to the second communications device version newer than the first communications device version; and
    performing, by the communications device with the first communications device version, the random access attempt based on the first signaling; or performing, by the communications device with the second communications device version, the random access attempt based on the second signaling, wherein
    the first signaling indicates at least one of a quantity of maximum random access attempts or a maximum quantity of random access attempts at the coverage enhancement level 0; and
    the second signaling indicates a maximum quantity of random access attempts at the coverage enhancement level 0.

3. The method according to claim 1, wherein the plurality of power control parameters further comprise a power offset of the third message relative to a preamble.

4. The method according to claim 1, the method further comprising:
    before performing the initial random access attempt, receiving, by the communications device, an indication signaling from the network device, wherein the indication signaling indicates at least one of a plurality of power control parameters, wherein the at least one of the plurality of power control parameters comprises at least one of:

the maximum transmit power of the communications device, the preamble initial received target power, or the power ramping step.

5. The method according to claim 1, the method further comprising:
before, receiving the msg2 and after performing the initial random access attempt at the coverage enhancement level 0, performing, by the communications device, a random access attempt at coverage enhancement level 1.

6. The method according to claim 5, the method further comprising:
before receiving the msg2 and after performing the random access attempt at the coverage enhancement level 1, performing, by the communications device, a random access attempt at coverage enhancement level 2.

7. A message transmission method, comprising:
determining, by a network device, at least one of a plurality of power control parameters, wherein the at least one of the plurality of power control parameters comprises at least one of:
a maximum transmit power of a terminal device, a preamble initial received target power, or a power ramping step;
sending, by the network device, an indication signaling to the terminal device, wherein the indication signaling indicates the at least one of the plurality of power control parameters;
sending, by the network device, a random access response (msg2) comprising repetition quantity information to the terminal device, wherein the repetition quantity information indicates a repetition quantity of a third message (msg3) in a sequence of messages comprised in a random access procedure or a feedback message of a fourth message (msg4) in the sequence of messages; and
receiving, by the network device from the terminal device, the msg3 or the feedback message of the msg4 transmitted according to a transmit power determined based on a plurality of power control parameters irrespective of the repetition quantity, wherein an initial random access attempt is performed by the terminal device at coverage enhancement level 0, wherein the plurality of power control parameters comprise: the maximum transmit power of the terminal device, a downlink path loss, the preamble initial received target power, a preamble attempt quantity, the power ramping step, and a transmission bandwidth parameter.

8. The method according to claim 7, wherein the method further comprises:
sending, by the network device, first signaling and second signaling for performing a random access attempt, wherein the first signaling corresponds to a first terminal device version, and the second signaling corresponds to a second terminal device version newer than the first terminal device version; wherein
the first signaling indicates at least one of a quantity of maximum random access attempts or a maximum quantity of random access attempts at coverage enhancement level 0; and
the second signaling indicates a quantity of maximum random access attempts.

9. The method according to claim 7, wherein the plurality of power control parameters further comprise a power offset of the third message relative to a preamble.

10. The method according to claim 7, wherein the at least one of the plurality of power control parameters further comprises a power offset of the msg3 relative to a preamble.

11. A communications device, comprising:
at least one processor;
one or more memories coupled to the at least one processor and storing programming instructions for execution by the at least one processor to perform operations comprising:
performing, during a random access procedure, an initial random access attempt at coverage enhancement level 0;
receiving a random access response (msg2) comprising repetition quantity information from a network device, wherein the repetition quantity information indicates a repetition quantity of a third message (msg3) in a sequence of messages comprised in the random access procedure or a feedback message of a fourth message (msg4) in the sequence of messages;
in response to receiving the msg2, determining a transmit power based on a plurality of power control parameters irrespective of the repetition quantity, wherein the plurality of power control parameters comprise: a maximum transmit power of the communications device, a downlink path loss, a preamble initial received target power, a preamble attempt quantity, a power ramping step, and a transmission bandwidth parameter; and
sending the msg3 or the feedback message of the msg4 to the network device based on the transmit power.

12. The communications device according to claim 11, wherein the operations further comprising:
receiving first signaling and second signaling from the network device for performing a random access attempt, wherein the first signaling corresponds to a first communications device version, and the second signaling corresponds to a second communications device version newer than the first communications device version; and
performing the random access attempt based on the first signaling in response to determining that the communications device is with the first communications device version; or performing the random access attempt based on the second signaling in response to determining that the communications device is with the second communications device version, wherein
the first signaling indicates at least one of a quantity of maximum random access attempts or a maximum quantity of random access attempts at a signal coverage enhancement level 0; and
the second signaling indicates a maximum quantity of random access attempts at the signal coverage enhancement level 0.

13. The communications device according to claim 11, wherein the plurality of power control parameters further comprise a power offset of the msg3 relative to a preamble.

14. The communications device according to claim 11, wherein the operations further comprising:
before performing the initial random access attempt at coverage enhancement level 0, receiving an indication signaling from the network device, wherein the indication signaling indicates at least one of a plurality of power control parameters, wherein the at least one of the plurality of power control parameters comprises at least one of:

the maximum transmit power of the communications device, the preamble initial received target power, or the power ramping step.

15. The communications device according to claim 11, wherein the operations further comprising:
before, receiving the msg2 and after performing the initial random access attempt at the coverage enhancement level 0, performing, by the communications device, a random access attempt at coverage enhancement level 1.

16. The communications device according to claim 15, the operations further comprising:
before receiving the msg2 and after performing the random access attempt at the coverage enhancement level 1, performing, by the communications device, a random access attempt at coverage enhancement level 2.

17. A network device, comprising:
at least one processor;
one or more memories coupled to the at least one processor and storing programming instructions for execution by the at least one processor to perform operations comprising:
determining at least one of a plurality of power control parameters, wherein the at least one of the plurality of power control parameters comprises at least one of: a maximum transmit power of a terminal device, a preamble initial received target power, or a power ramping step;
sending an indication signaling to the terminal device, wherein the indication signaling indicates the at least one of the plurality of power control parameters;
sending a random access response (msg2) comprising repetition quantity information to the terminal device, wherein the repetition quantity information indicates a repetition quantity of a third message (msg3) in a sequence of messages comprised in a random access procedure or a feedback message of a fourth message (msg4) in the sequence of messages; and
receiving, from the terminal device, the msg3 or the feedback message of the msg4 transmitted according to a transmit power determined based on a plurality of power control parameters irrespective of the repetition quantity, wherein an initial random access attempt is performed by the terminal device at a first coverage enhancement level, wherein the plurality of power control parameters comprise: the maximum transmit power of the terminal device, a downlink path loss, the preamble initial received target power, a preamble attempt quantity, the power ramping step, and a transmission bandwidth parameter.

18. The network device according to claim 17, wherein the operations further comprising:
sending first signaling and second signaling for performing a random access attempt, wherein:
the first signaling corresponds to a first terminal device version, and the second signaling corresponds to a second terminal device version newer than the first terminal device version;
the first signaling indicates at least one of a quantity of maximum random access attempts or a maximum quantity of random access attempts at coverage enhancement level 0; and
the second signaling indicates a quantity of maximum random access attempts.

19. The network device according to claim 17, wherein the plurality of power control parameters further comprise a power offset of the msg3 relative to a preamble.

20. The network device according to claim 17, wherein the at least one of the plurality of power control parameters further comprises a power offset of a third message the msg3 relative to a preamble.

* * * * *

UNITED STATES PATENT AND TRADEMARK OFFICE
CERTIFICATE OF CORRECTION

PATENT NO. : 11,523,347 B2
APPLICATION NO. : 16/875226
DATED : December 6, 2022
INVENTOR(S) : Yuwan Su et al.

It is certified that error appears in the above-identified patent and that said Letters Patent is hereby corrected as shown below:

In the Claims

Column 47, In Line 6, Claim 5, delete "before," and insert -- before --.

Column 48, In Line 51, Claim 12, delete "attempts at a signal" and insert -- attempts at --.

Column 48, In Line 54, Claim 12, delete "the signal" and insert -- the --.

Column 49, In Line 6, Claim 15, delete "before," and insert -- before --.

Column 50, In Line 34, Claim 20, delete "of a third message" and insert -- of --.

Signed and Sealed this
Seventeenth Day of October, 2023

Katherine Kelly Vidal
*Director of the United States Patent and Trademark Office*